United States Patent
Patel et al.

(10) Patent No.: US 12,176,844 B2
(45) Date of Patent: Dec. 24, 2024

(54) SYSTEMS AND METHODS FOR GENSET COOLANT CONTROL

(71) Applicant: Cummins Power Generation Limited, Ramsgate (GB)

(72) Inventors: Ankit Vinodchandra Patel, Margate (GB); Raghunandan Subramaniam, Newington (GB); Philippe Goesel, Ramsgate (GB); Apoorv Prakash Hiremath, Sittingbourne (GB)

(73) Assignee: Cummins Power Generation Limited, Ramsgate (GB)

( * ) Notice: Subject to any disclaimer, the term of this patent is extended or adjusted under 35 U.S.C. 154(b) by 0 days.

(21) Appl. No.: 17/692,658

(22) Filed: Mar. 11, 2022

(65) Prior Publication Data
US 2022/0302860 A1 Sep. 22, 2022

Related U.S. Application Data

(60) Provisional application No. 63/200,579, filed on Mar. 16, 2021.

(51) Int. Cl.
*F01P 7/14* (2006.01)
*F01P 7/16* (2006.01)
(Continued)

(52) U.S. Cl.
CPC ............. *H02P 9/102* (2013.01); *F01P 7/16* (2013.01); *F01P 2007/146* (2013.01);
(Continued)

(58) Field of Classification Search
CPC .......... F01P 7/167; F01P 7/16; F01P 2025/30; F01P 2025/32; F01P 2025/62; F01P 2007/146; H02P 2101/25
See application file for complete search history.

(56) References Cited

U.S. PATENT DOCUMENTS 2,975,308 A * 3/1961 Kilbourne ............... H02K 9/00
310/53
4,545,333 A 10/1985 Nagumo et al.
(Continued)

FOREIGN PATENT DOCUMENTS

CN 205130855 U * 4/2016
CN 108643994 B * 6/2020 ............... F01N 5/02
(Continued)

OTHER PUBLICATIONS

CN 108643994B English translation (Year: 2020).*
(Continued)

*Primary Examiner* — George C Jin
*Assistant Examiner* — Teuta B Holbrook
(74) *Attorney, Agent, or Firm* — Foley & Lardner LLP

(57) ABSTRACT

Systems and methods for regulating an outlet coolant temperature of a genset and an inlet coolant temperature of the genset are provided. A load condition of the genset may be determined. An operating mode can be selected from between a first mode associated with a first load condition and a second mode associated with a second load condition responsive to determining the load condition of the genset. The first mode and the second mode may be configured to determine a target inlet coolant temperature using one or more control loops. The target inlet coolant temperature may be determined using the selected operating mode, a target outlet coolant temperature and the outlet coolant temperature. The outlet coolant temperature may be regulated based on the determined target inlet coolant temperature and the inlet coolant temperature by adjusting an operation of one or more coolant valves.

20 Claims, 9 Drawing Sheets

(51) Int. Cl.
*H02P 9/10* (2006.01)
*H02P 101/25* (2016.01)
(52) U.S. Cl.
CPC ....... *F01P 2025/30* (2013.01); *F01P 2025/32* (2013.01); *F01P 2025/62* (2013.01); *H02P 2101/25* (2015.01)

(56) References Cited

U.S. PATENT DOCUMENTS

| | | | |
|---|---|---|---|
| 5,584,176 A * | 12/1996 | Meyer | F02D 41/1459 60/284 |
| 6,351,692 B1 | 2/2002 | Eaton et al. | |
| 6,555,929 B1 | 4/2003 | Eaton et al. | |
| 7,509,221 B2 | 3/2009 | Folken et al. | |
| 8,430,068 B2 | 4/2013 | Harris et al. | |
| 8,550,038 B2 | 10/2013 | Marlenee et al. | |
| 8,922,033 B2 | 12/2014 | Vallinayagam et al. | |
| 9,188,053 B2 | 11/2015 | Abihana | |
| 9,194,286 B2 | 11/2015 | Burnham et al. | |
| 9,599,010 B2 | 3/2017 | Ichihara et al. | |
| 9,695,167 B2 | 7/2017 | Wu et al. | |
| 10,316,731 B2 | 6/2019 | Park et al. | |
| 10,690,074 B2 | 6/2020 | Oguguo et al. | |
| 2006/0196451 A1 | 9/2006 | Braun et al. | |
| 2010/0154730 A1 * | 6/2010 | Scolton | F01P 7/167 123/41.09 |
| 2010/0241341 A1 * | 9/2010 | Yun | F02D 41/3041 123/295 |
| 2013/0061833 A1 | 3/2013 | Falkowski et al. | |
| 2013/0269925 A1 * | 10/2013 | Baruschke | F28F 27/00 165/287 |
| 2015/0236630 A1 | 8/2015 | Cooper et al. | |
| 2016/0254768 A1 | 9/2016 | Falkowski et al. | |
| 2017/0321597 A1 * | 11/2017 | Michikawauchi | F01P 7/165 |
| 2018/0073421 A1 | 3/2018 | Hutchins | |
| 2018/0128156 A1 | 5/2018 | Watson et al. | |
| 2018/0262139 A1 | 9/2018 | Oguguo et al. | |
| 2020/0040805 A1 | 2/2020 | Kim et al. | |

FOREIGN PATENT DOCUMENTS

| | | | |
|---|---|---|---|
| CN | 111365135 A * | 7/2020 | F02D 29/06 |
| CN | 111636959 A * | 9/2020 | F01P 7/16 |
| CN | 112049716 A * | 12/2020 | F01D 15/10 |
| DE | 102016210431 A1 * | 12/2016 | |
| DE | 102017123468 A1 * | 4/2019 | F01P 3/20 |
| JP | H05231149 A * | 9/1993 | |
| JP | 2004-023986 | 1/2004 | |
| JP | 2012-104313 A | 5/2012 | |
| JP | 2015094264 A * | 5/2015 | |
| KR | 100638225 B1 * | 4/2016 | |
| KR | 101686505 B1 * | 12/2016 | |
| WO | WO-2016/054337 A1 | 4/2016 | |
| WO | WO-2021006036 A1 * | 1/2021 | |
| WO | WO-2021195029 A1 * | 9/2021 | F01P 3/20 |

OTHER PUBLICATIONS

DE 102016210431 A1 English Translation (Year: 2016).*
Extended Search Report for European Application No. EP 22161878.8 mailing date Aug. 30, 2022, 8 pages.
International Search Report and Written Opinion for PCT App. No. PCT/US2021/023600, mailed Jun. 8, 2021, 8 pages.

* cited by examiner

SYSTEMS AND METHODS FOR GENSET COOLANT CONTROL

This application claims the benefit of and priority to U.S. Patent Application No. 63/200,579, entitled "Systems and Methods for Genset Coolant Control", filed Mar. 16, 2021, the entirety of which is incorporated by reference herein.

TECHNICAL FIELD

Technical Field

The present disclosure relates generally to monitoring and control of generator sets (gensets).

Background

Generator sets (gensets) can be used for power generation in locomotives, trucks, recreational vehicles, marine vessels as well as for grid power generation. Gensets may include a prime mover, such as an internal combustion (IC) engine, that converts fuel into mechanical energy to rotate a generator (e.g., an alternator). The generator can convert the mechanical energy into useable electrical energy at a line voltage and frequency suitable for transmission and utilization. Certain gensets may use a cooling system to adjust the temperature of the engine. During operation, a cooling substance can flow through the engine to reduce heat generated by the engine. The heated substance may circulate from the engine through a heat exchanger, a radiator, and/or other cooling devices. The heated substance may release the absorbed heat by flowing through the heat exchanger (or other cooling devices), thereby reducing the temperature of the heated substance. The cooling system may circulate the cooled substance through the engine to remove accumulated heat.

SUMMARY

One embodiment of the disclosure relates to a method of regulating an outlet coolant temperature of a genset and an inlet coolant temperature of the genset. The genset may comprise an engine, a generator, and at least one controller. The method includes determining a load condition of the genset. The method includes selecting an operating mode from between a first mode associated with a first load condition and a second mode associated with a second load condition responsive to determining the load condition of the genset. The first mode and the second mode can be configured to determine a target inlet coolant temperature using one or more control loops. The method includes determining, using the selected operating mode, the target inlet coolant temperature using a target outlet coolant temperature and the outlet coolant temperature. The method includes regulating the outlet coolant temperature based on the determined target inlet coolant temperature and the inlet coolant temperature by adjusting an operation of one or more coolant valves.

In some embodiments, selecting the operation mode includes selecting the first mode responsive to determining the load condition of the genset is the first load condition. In some embodiments, the first load condition may be a steady state condition in which a load of the generator is below a predetermined load threshold value. In some embodiments, selecting the operating mode includes selecting the second mode responsive to determining the load condition of the genset is the second load condition. In some embodiments, the second load condition may be a steady state condition in which a load of the generator is above a predetermined load threshold value. In some embodiments, the method includes determining the load condition of the genset is a transient condition in which a load of the generator undergoes a transitory change, wherein the transitory change comprises a change of at least 4% of a nominal load value.

In some embodiments, the method includes adjusting the target inlet coolant temperature for a period of time using an interpolation calculator responsive to determining the load condition of the genset corresponds to the transient condition. In some embodiments, the interpolation calculator may be configured to adjust the target inlet coolant temperature using at least one of: a cold start indicator or the load of the generator, wherein the cold start indicator comprises an indication of whether the outlet coolant temperature reaches a predetermined temperature threshold value.

In some embodiments, the method includes determining the load condition of the genset is a start-up condition in which the generator is turned on for a first time and/or an operating temperature of the generator is below a predetermined temperature threshold value. In some embodiments, determining that the load condition of the genset is the start-up condition is based on information provided by a cold start indicator.

In some embodiments, the method includes determining the target inlet coolant temperature using at least one of a plurality of analog proportional-integral-derivative (PID) control loops, a plurality of binary PID control loops, and the interpolation calculator. In some embodiments, the interpolation calculator and the plurality of analog PID control loops are external control loops and the plurality of binary PID control loops are internal control loops. In some embodiments, the internal control loops are configured to receive one or more inputs from the external control loops. In some embodiments, the internal control loops are configured adjust the operation of the one or more coolant valves. In some embodiments, the external control loops are configured to determine the target inlet coolant temperature configured to be received as the one or more inputs by the internal control loops.

Another embodiment relates to a control device for regulating an outlet coolant temperature of a genset and an inlet coolant temperature of the genset. The genset includes an engine, a generator, and at least one control device. The control device includes a machine-readable storage medium having instructions stored thereon and a processing circuit configured to execute the instructions to: determine a load condition of the genset, select an operating mode from between a first mode associated with a first load condition and a second mode associated with a second load condition responsive to determining the load condition of the genset, wherein the first mode and the second mode are configured to determine a target inlet coolant temperature using one or more control loops, determine, using the selected operating mode, the target inlet coolant temperature using a target outlet coolant temperature and the outlet coolant temperature, and regulate the outlet coolant temperature based on the determined target inlet coolant temperature and the inlet coolant temperature by adjusting an operation of one or more coolant valves.

Another embodiment relates to genset. The genset includes an engine, a generator coupleable to a load, and a cooling system configured to adjust a temperature of the engine. The cooling system includes a heat exchanger, a radiator, one or more coolant valves, one or more temperature sensors, and at least one controller configured to regulate an outlet coolant temperature of the genset and an inlet coolant temperature of the genset. The controller includes a machine-readable storage medium having instructions stored thereon and a processing circuit configured to execute the instructions to: determine a load condition of the genset, select an operating mode from between a first mode associated with a first load condition and a second mode associated with a second load condition responsive to determining the load condition of the genset, wherein the first mode and the second mode are configured to determine a target inlet coolant temperature using one or more control loops, determine, using the selected operating mode, the target inlet coolant temperature using a target outlet coolant temperature and the outlet coolant temperature, and regulate the outlet coolant temperature based on the determined target inlet coolant temperature and the inlet coolant temperature by adjusting an operation of one or more coolant valves.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
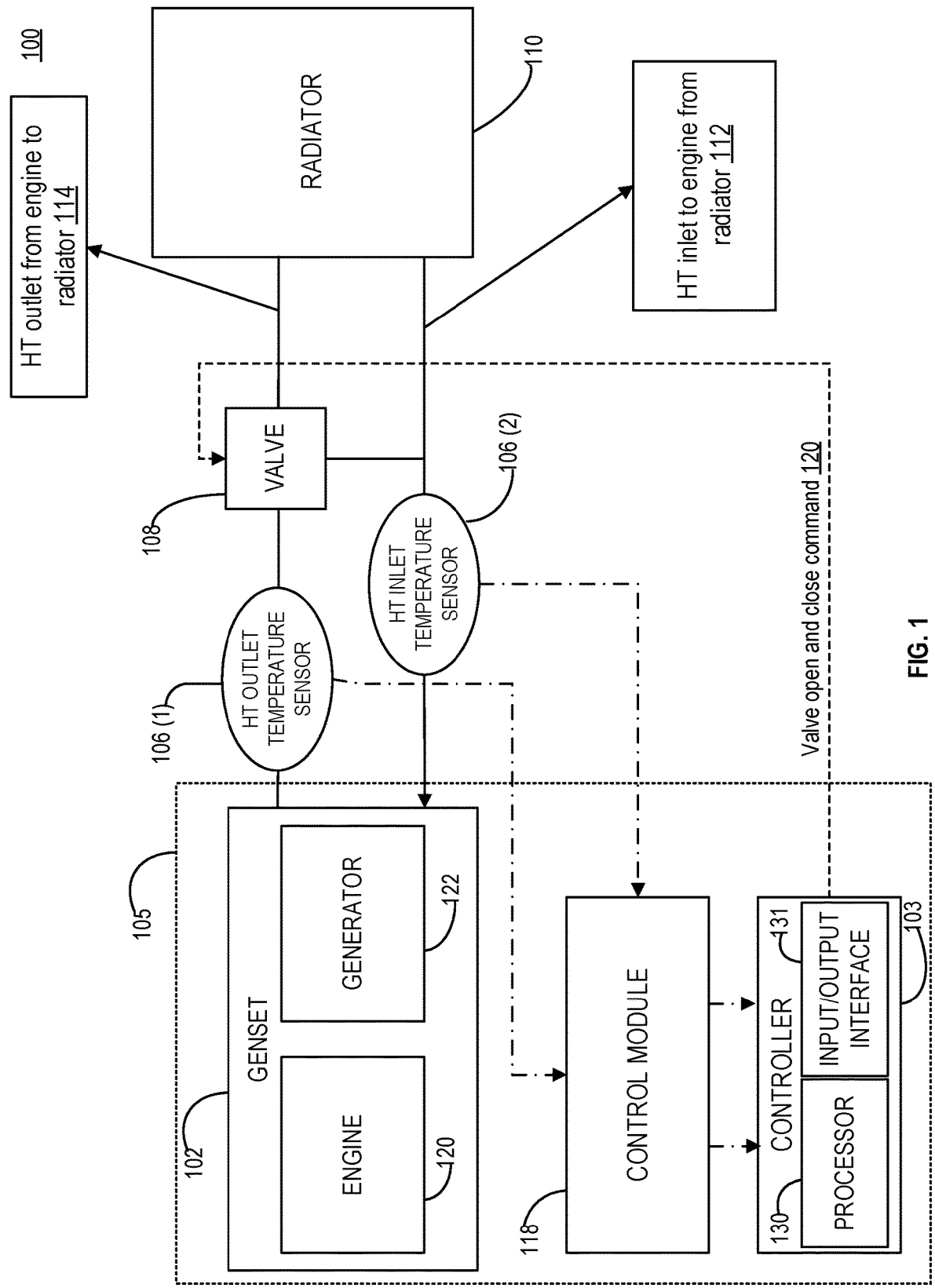
FIG. 1 is a block diagram illustrating a generator system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to regulate an outlet coolant temperature of a genset and an inlet coolant temperature of the genset are provided according to exemplary embodiments. The genset may include an engine, a generator (e.g., an alternator), at least one controller, and other components. An inlet coolant temperature of a genset (e.g., a high temperature (HT) inlet temperature) may specify a temperature of a cooling substance, such as coolant, as the cooling substance enters the engine. An outlet coolant temperature of the genset (e.g., an HT outlet temperature) may indicate a temperature of the cooling substance as the cooling substance leaves the engine.

Certain gensets may use a cooling system to adjust the temperature of the engine or other components of the genset. The cooling system may include a heat exchanger, a radiator, or other cooling devices, as well as one or more valves, one or more temperature sensors and/or at least one controller. In some embodiments, a cooling system may cause a cooling substance, such as coolant, to flow or circulate through or around the engine (or other components of the genset) to reduce or absorb heat (e.g., heat generated by the engine). The cooling system may prevent or reduce overheating of the engine or other components of the genset. As the coolant flows through or around the engine, for example, the coolant can absorb heat from the engine, thereby reducing the temperature of the engine during operation while increasing the temperature of the coolant. The cooling system may pump, drive, guide, or otherwise circulate the heated coolant (e.g., HT coolant) from the engine through a radiator, for instance, causing a reduction of the temperature of the heated coolant. In certain embodiments, one or more temperature sensors (e.g., HT outlet temperature sensors or other sensors) can measure or monitor an outlet coolant temperature of the genset (the temperature of the heated coolant as it leaves the engine, such as an HT outlet temperature). If the temperature of the heated coolant at an outlet of the engine (e.g., an outlet coolant temperature of the genset) meets or exceeds a certain temperature value, the cooling system may direct, route, or guide the heated coolant through the radiator to reduce, decrease, or regulate the temperature of the heated coolant. One or more temperature sensors (e.g., HT inlet temperature sensors) can monitor or measure an inlet coolant temperature of the genset (e.g., the temperature of the coolant as it leaves the radiator or enters the engine).

However, regulating the outlet coolant temperature or the inlet coolant temperature by monitoring the temperature of the coolant at the outlet of the engine may cause unreliable performance results in the genset, such as temperature oscillations and temperature overshoots/undershoots. For example, certain coolant systems may adjust or regulate the inlet coolant temperature by measuring the temperature of the coolant as it leaves the engine. If a load of a generator changes (e.g., a ±4% change in load) or the inlet coolant temperature is below a certain temperature value (e.g., inlet coolant temperature is less than 90° C. due to weather conditions), adjusting the inlet coolant temperature by measuring the outlet coolant temperature may cause or introduce temperature oscillations. The temperature oscillations can be caused by a delay between the change in the load of the generator, for example, and a response of the cooling system (e.g., a response to a change in the outlet coolant temperature).

Ensuring that the engine of the genset operates at a proper temperature (e.g., proper inlet coolant temperature and/or proper outlet coolant temperature) may result in an optimum performance of the engine and genset. An engine with an operating temperature exceeding a certain temperature value (e.g., 90° C. or other temperature values) can cause permanent damage to the engine and/or to peripheral components (e.g., exhaust manifold, catalytic converters, etc.). Furthermore, an engine with an operating temperature below a certain temperature value may suffer from, among other detriments, inefficient fuel economy. Therefore, maintaining an operating temperature in the engine or genset may support, enhance, or improve short-term performance of the engine and long-term engine health.

The present disclosure provides exemplary systems and methods for regulating the outlet coolant temperature and the inlet coolant temperature by determining a target inlet coolant temperature (e.g., via one or more control loops) using a target outlet coolant temperature (e.g., 90° C. or other values), an outlet coolant temperature, and/or a load of a generator. The outlet coolant temperature of the genset can be regulated or adjusted using the determined target inlet coolant temperature and the inlet coolant temperature. The systems and methods presented herein may prevent temperature oscillations, temperature overshoots, and/or temperature undershoots in a genset (e.g., in an engine of the genset). Furthermore, exemplary systems and methods may improve the temperature stability of the generator during a transient load, reduce cylinder knock, and decrease NOx emission deviations from a predetermined standard. According to some embodiments, the systems and methods of the present disclosure may reduce or decrease power consumption and noise emission from a radiator fan by increasing an outlet temperature of the radiator.

An exemplary method includes determining, by at least one controller, for example, a load condition of the genset. Responsive to determining the load condition, the at least one controller may select or identify an operating mode from between a first mode associated with a first load condition and a second mode associated with a second load condition. The first mode and the second mode are configured to determine a target inlet coolant temperature using one or more control loops. The at least one controller (or other components of the genset) may use the selected operating mode to determine the target inlet coolant temperature using a target outlet coolant temperature and the outlet coolant temperature. The at least one controller, for example, may adjust an operation of one or more coolant valves to regulate the outlet coolant temperature based on the determined target inlet coolant temperature and the inlet coolant temperature.

Referring to FIG. 1, a block diagram illustrating a generator system 100 according to an exemplary embodiment is shown. In the illustrated embodiment, the generator system 100 includes a genset 102, one or more temperature sensors 106, one or more valves 108, a radiator 110, at least one controller 103, and a control module 118. In some embodiments, the generators system 100 may include one or more gensets 102. In some embodiments, a housing 105 of the generator system 100 can include the gensets 102, the controller 103 and the control module 118 (e.g., the same generator system 100 can include the genset 102, the controller 103, and the control module 118). In some embodiments, the genset 102 can be separate and communicatively coupled to the controller 103, the control module 118, and the radiator 110, such that the controller 103, the control module 118, and the radiator 110 are separate from the generator system 100. The genset 102 may include an engine 120 coupled to a generator 122. In some embodiments, the genset 102 may include one or more engines 120 and generators 122. The engine 120 may be any type of machine configured to convert energy, such as fuel, into mechanical energy (e.g., motion). The engine 120 may be an internal combustion engine (e.g., gasoline engine, natural gas engine, or diesel engine), a hybrid engine (e.g., a combination of an internal combustion engine and an electric motor), a high horse power engine (HHPE), and/or any other suitable engine. The engine 120 may be any type of engine that uses a cooling substance, such as a coolant, to maintain a target operating temperature.

The generator 122 may be any type of machine configured to convert mechanical energy into electrical energy, such as an alternating current. The generator 122 can include a wound rotor or permanent magnet alternator configured to convert a rotational mechanical power produced by the engine 120 into electrical energy. In some embodiments, the generator 122 can be mechanically coupled to the engine 120 by a mechanical linkage that can provide a desired turn ratio, a torque converter, a transmission, any other form of rotary linking mechanism, or a combination thereof. In some embodiments, an inverter can also be electrically coupled to the generator 122.

The generator 122 is configured to produce an electrical output. The electrical output can include a voltage and/or a current, and is representative of a load on the engine 120. For example, the electrical output can correspond to the engine 120 power (e.g., power=voltage×current). In particular embodiments, the electrical output from the generator 122 can be converted or inverted to transform the electrical output from a direct current (DC) to an alternating current (AC). In some embodiments, the genset 102 may include different and/or additional components than engine 120 and generator 122 (e.g., a hydraulically powered generator driven using hydraulic fluid). The generator system 100 may be a mastered or masterless system (e.g., a masterless load demand genset system or a mastered paralleled genset system, with a centralized system controller coordinating the gensets 102 of the system 100, or a distributed system 100 control contained in the gensets 102 of the system 100, respectively).

The at least one controller 103 may include a processor 130 and an input/output terminal 131. The processor 130 may include one or more processors or one or more processors that include multiple processing cores. The processor 130 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor 130 may be a microprocessor or any conventional processor, or state machine. A processor 130 may be implemented as a combination of computing devices, such as a combination of a DSP and a microprocessor, a plurality of microprocessors, one or more microprocessors in conjunction with a DSP core, or any other such configuration. In some embodiments, the one or more processors 130 may be shared by multiple circuits (e.g., one or more circuits may share the same processor 130 which, in some example embodiments, may execute instructions stored, or otherwise accessed, via different areas of memory). Alternatively or additionally, the one or more processors 130 may be structured to perform or otherwise execute certain operations independent of one or more co-processors. In other example embodiments, two or more processors 130 may be coupled via a bus to enable independent, parallel, pipelined, or multi-threaded instruction execution. All such variations are intended to fall within the scope of the present disclosure.

The controller 103 may include a memory device that is configured to store machine-readable media. The machine readable media being readable by the processor 130 in order to execute the programs stored therein. The memory device (e.g., memory, memory unit, storage device) may include one or more devices (e.g., RAM, ROM, Flash memory, hard disk storage) for storing data and/or machine-readable media for completing or facilitating the various processes, layers and modules described in the present disclosure. The memory device may be communicatively coupled to the processor 130 to provide computer code, machine-readable media, or instructions to the processor 130 for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein. The memory device may include or store a database of target values (e.g., a target inlet coolant temperature or a target outlet coolant temperature) or other control or calculation parameters.

In some embodiments, the controller 103 can be coupled to the engine 120, the control module 118, the one or more valves 108, and/or other components of the generator system 100 via the input/output interface 131. The input/output interface 131 may include one or more terminals configured to connect to the genset 102, the control module 118, and the one or more valves 108. For example, one or more input terminals of the input/output interface 131 may be connected to one or more output terminals of the control module 118 in order to receive one or more measured temperature values (e.g., an inlet coolant temperature and an outlet coolant temperature measured by the temperature sensors 106). Additionally, the input/output interface 131 may include one or more output terminals configured to connect to one or more valves 108 (e.g., one or more coolant valves) in order to adjust an operation of the one or more valves 108 (e.g., to regulate an outlet coolant temperature). The output terminals may be configured to send or transmit a signal to the one or more valves 108, wherein the signal may cause the one or more valves 108 to "open" or "close" (e.g., adjust the operation of the one or more valves 108). The one or more input terminals and the one or more output terminals of the input/output interface 131 may be embodied as one or more physical contacts or as a combination of physical electrical contacts and wireless terminals.

In some embodiments, the input/output interface 131 of the controller 103 includes an electrical bus. In some embodiments, the input/output interface 131 may be wired via a physical electrical connection to some components (e.g., to the genset 102 or the one or more valves 108) and wirelessly connected to other components (e.g., to the control module 118 or the one or more temperature sensors 106). In some embodiments, the input/output interface 131 is connected to one or more components wirelessly. That is, it is to be appreciated that terms such as "terminal" are not meant to be limited to a physical terminal configured to be connected physically to another device or "terminal" unless expressly recited.

In some embodiments, the input/output interface 131 of the controller 103 may include one or more input terminals connected to one or more temperature sensors 106 or other sensors that measure the voltage, power factor, power, and current of the output of the genset 102. In some embodiments, the controller 103 may receive the information regarding the temperature (e.g., an outlet coolant temperature and an inlet coolant temperature), voltage, power factor, power, and current of the genset 102 from one or more sensors (e.g., one or more temperature sensors 106). In some embodiments, the controller 103 may receive the information regarding the temperature, voltage, power factor, power, and current of the genset 102 from the control module 118. For example, the controller 103 may receive sensed/measured values of the inlet coolant temperature and the outlet coolant temperature from the control module 118. In some embodiments, the controller 103 may receive information regarding the temperature, voltage, power factor, power, and current of the genset 102 from multiples sources (e.g., the control module 118 and the sensors 106).

In some embodiments, the controller 103 can be included in the control module 118. The control module 118 (e.g., an engine control module (ECM)) may be in electrical communication with one or more of the components of the genset 102 described herein, such as the engine 120 or the temperature sensors 106. In some embodiments, the control module 118 may control or regulate the performance of the engine 120. Furthermore, the control module 118 may be operable to perform the sensing and control functions described herein. For example, the control module 118 may perform the sensing of one or more temperature values (e.g., inlet coolant temperature and outlet coolant temperature) measured by the temperature sensors 106 via an input/output interface of the control module 118. In another example, the control module 118 can perform the control and sensing functions as described herein in reference to the controller 103. In some embodiments, the control module 118 and the controller 103 may be integrated into one device (e.g., the communication between the control module 118 and the controller 103 can be direct). In other embodiments, the control module 118 and the controller 103 may be separated into different devices that are communicatively coupled. Additionally or alternatively, the controller 103 may be connected to the genset 102 in a similar manner as the control module 118, such that the controller 103 may perform the functions as described in reference to the control module 118.

In some embodiments, the at least one controller 103 (or control module 118) may be configured to at least partly control the operation of the one or more valves 108, the engine 120, and/or other components of the generator system 100. The controller 103 (or the control module 118) may be configured to determine a load condition of the genset 102, wherein the load condition includes a steady state condition, a transient condition, and/or other load conditions. Responsive to determining the load condition of the genset 102, the controller 103 (or the control module 118) can select an operating mode from between a first mode and a second mode. The first mode may be associated with a first load condition, such as a steady state condition in which a load of the generator 122 is below a predetermined load threshold value. The second mode may be associated with a second load condition, such as a steady state condition in which a load of the generator 122 is above a predetermined load threshold value.

The controller 103 (or the control module 118) may be configured to use the selected operating mode (e.g., the first mode or the second mode) to determine a target inlet coolant temperature. The controller 103 (or the control module 118) may determine the target inlet coolant temperature using a target outlet coolant temperature and/or an outlet coolant temperature. In some embodiments, the controller 103 (or the control module 118) may regulate the outlet coolant temperature based on the determined target inlet coolant temperature and/or the inlet coolant temperature. For example, the controller 103 may adjust an operation of one or more coolant valves 108 to regulate the outlet coolant temperature. By adjusting the operation of one or more coolant valves 108, the controller 103 (or the control module 118) can modify or adjust a flow of a cooling substance, such as coolant, through the generator system 100 and regulate the outlet coolant temperature.

In the illustrated embodiment, the generator system 100 may include one or more temperature sensors 106. The one or more temperature sensors 106 may include an outlet temperature sensor 106(1) and an inlet temperature sensor 106(2). An inlet temperature sensor 106(2) can be placed or positioned on a cold side of the engine 120. A cold side of the engine may indicate that the coolant (or other cooling substance) has yet to be circulated through the engine 120 to absorb heat (e.g., heat generated by the engine 120). The inlet temperature sensor 106(2) may be configured to sense a temperature of the coolant as the coolant enters the engine 120. The outlet temperature sensor 106(1) can be placed or positioned on a hot side of the engine 120. A hot side of the engine may specify that the coolant has circulated through the engine 120 and has absorbed heat (e.g., heat generated by the engine 120). The outlet temperature sensor 106(1) may be configured to sense a temperature of the coolant as the coolant leaves the engine 120. The inlet temperature sensor 106(2) and outlet temperature sensor 106(1) may include one or more sensors arranged to measure or otherwise acquire data, values, or information regarding the temperature of the coolant. The one or more temperature sensors 106 may be real sensors, virtual sensors, or a combination thereof.

In some embodiments, the inlet temperature sensor 106(2) and the outlet temperature sensor 106(1) may be configured to send or transmit one or more signals to the control module 118 (or the controller 103). The signal(s) may specify or provide the temperature of the coolant as it flows through or proximate to the inlet temperature sensor 106(1) and the outlet temperature sensor 106(2). The control module 118 (or the controller 103) may use the signal(s) received from the temperature sensors 106 to analyze the temperature of the coolant in the generator system 100 and perform various operations or actions in response to the signal(s). For example, the control module 118 may receive the signal(s) from the one or more temperature sensors 106 and transmit the signal(s) to the controller 103. The controller 103 may use the received signal(s) from the control module 118 to analyze the temperature of the coolant in the generator system 100 and perform various operations or actions in response to these signals.

In the illustrated embodiment, the generator system 100 may include one or more valves 108 and a radiator 110. A cooling substance, such as coolant, may be any type of heat transfer substance that is capable of absorbing heat from the engine 120, such as water, inorganic additive technology, organic additive technology, hybrid organic acid technology, oil, glycol-based fluids, and/or other types of substances. The radiator 110 can serve as a heat exchanger for the cooling substance (e.g., coolant or other substances) within the generator system 100. In some embodiments, the radiator 110 may include a cooling fan that increases the cooling rate of the coolant (or other substances) that flows through the radiator 110. The radiator 110 can be coupled to the engine 120 and configured to receive coolant from the engine 120. In some embodiments, the one or more valves 108 may include at least one coolant valve (e.g., an AMOT valve). The coolant valve can be a three-way coolant valve configured to receive coolant from the engine 120. The coolant valve may direct or guide the coolant from the engine 120 either back to the engine 120 or to the radiator 110. The coolant valve may be any type of valve suitable for receiving hot coolant from the engine 120 and selectively diverting coolant back to the engine 120 or the radiator 110 (e.g., thermostatic three-way valve, electrical or other actuated three-way valve, a suitable non-three-way valve, or other types of valves).

In some embodiments, coolant (or other cooling substances) can be pumped or directed (e.g., pumped by a coolant pump) into the engine 120 at an inlet (e.g., a "cold side"). The coolant may flow through the engine 120 and absorb heat produced by the engine 120. Therefore, the temperature of the engine 120 may decrease, while the temperature of the coolant may increase. The coolant may leave the engine 120 at an outlet (e.g., a "hot side") and flow into the coolant valve (e.g., one or more valves 108). In some embodiments, the coolant valve may route a portion of the coolant back into the engine 120 (e.g., pumped by a coolant pump) without flowing through the radiator 110. The coolant valve may direct another portion of the coolant to the radiator 110. If the portion of the coolant is directed to the radiator 110, the radiator 110 may reduce or decrease the temperature of the coolant through at least one of exposure to outside air or the cooling fan. The coolant, after being cooled (e.g., a reduction of the temperature of the coolant) by the radiator 110, can be directed into the engine 120, where the coolant flow process may repeat itself. The operation of the coolant valves (e.g., directing a portion of the heated coolant from the engine 120 to the radiator 110 or directing the heated coolant back to the engine 120) may be regulated or controlled by the controller 103 or the control module 118.

In some embodiments, the one or more valves 108 (e.g. one or more coolant valves) may be downstream from the radiator 110. Therefore, the coolant valve may be configured to combine cooled coolant from the radiator 110 with heated coolant from the engine 120. For example, the heated coolant leaving the engine 120 may flow into a T-junction. A portion of the heated coolant can be directed from the T-junction to the radiator 110, while another portion of the heated coolant bypasses the radiator 110 and flows into the coolant valve. The coolant flowing into the radiator 110 may be exposed to at least one of outside air or the cooling fan, thereby reducing the temperature of the coolant. The coolant valve may combine a portion of the heated coolant from the engine 120 and a portion of the cooled coolant from the radiator 110, based on analysis and direction from the controller 103 or the control module 118. In such embodiments, the coolant valve may be referred to as a "mixing valve."

Figure 2:
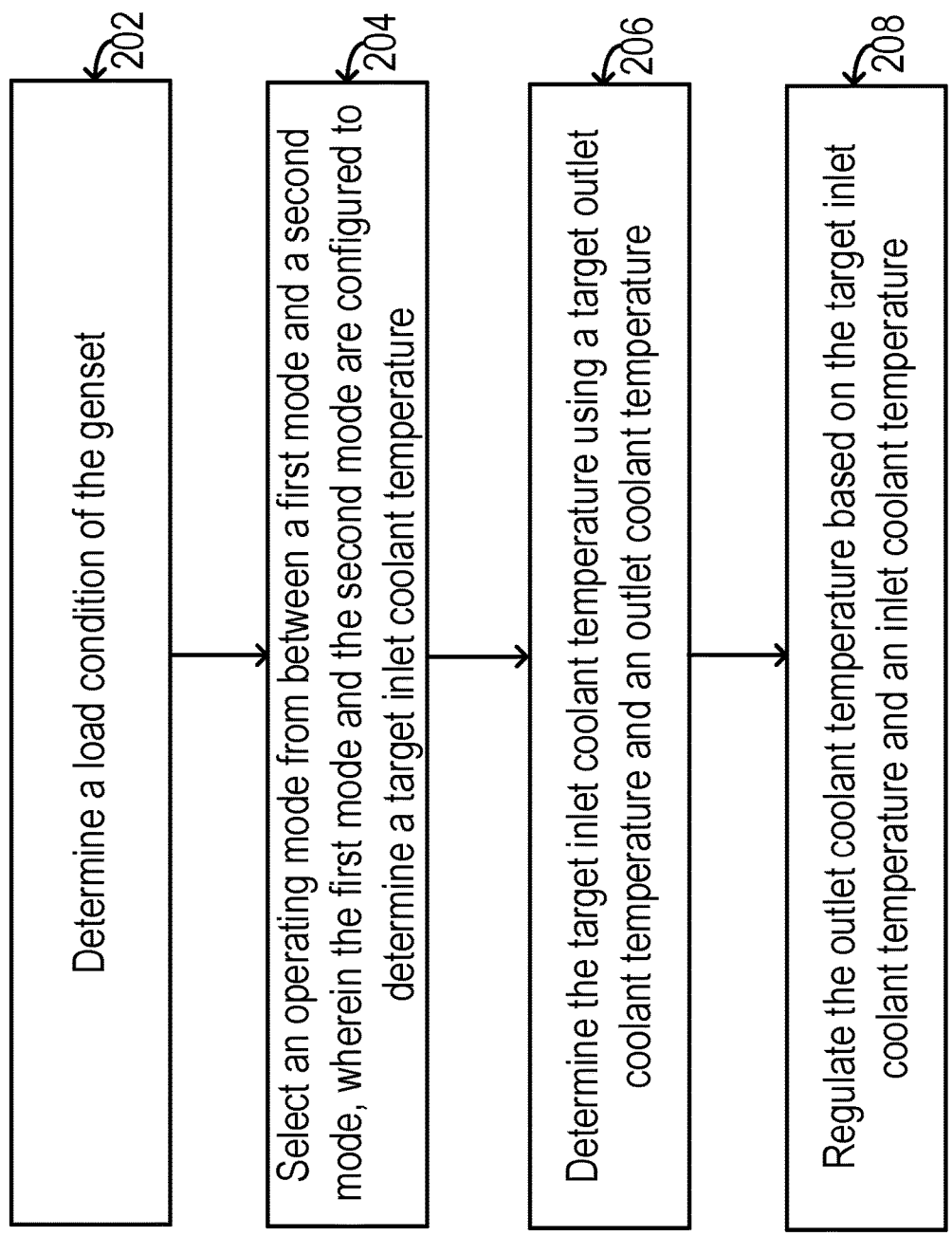
FIG. 2 is a flow diagram of a method for regulating an outlet coolant temperature of a genset and an inlet coolant temperature of the genset, according to an exemplary embodiment.

FIG. 2 illustrates a flow diagram of a method 200 for regulating an outlet coolant temperature of a genset 102 and an inlet coolant temperature of the genset 102, according to an exemplary embodiment. The method 200 may be implemented using any of the components and devices detailed herein in conjunction with FIG. 1. In overview, the method 200 may include determining a load condition of the genset 102 (202). The method 200 may include selecting an operating mode from between a first mode and a second mode (204). The method 200 may include determining a target inlet coolant temperature using a target outlet coolant temperature and the outlet coolant temperature (206). The method 200 may include regulating the outlet coolant temperature based on the target inlet coolant temperature and the inlet coolant temperature (208).

Referring now to operation 202, and in some embodiments, the method 200 may include determining a load condition of the genset 102. For example, the controller 103 (or other components of the generator system 100, such as the control module 118) may determine or identify a load condition of the genset 102. In some embodiments, the load condition of the genset 102 may include a steady state condition and/or other types of load conditions. A steady state condition may describe a load condition of the genset 102 in which a load of the genset 102 is unchanged, constant, or steady for a certain time period. The operation or performance of one or more components of the generator system 100, such as the genset 102, may be stable or constant during a steady state condition. In some embodiments, the load condition of the genset 102 may correspond to a steady state condition in which the load of the generator 122 is below or above a predetermined load threshold value (e.g., 70% of a nominal load). For example, the load condition of the genset 102 may be a steady state condition in which the load of the generator 122 is below 70% (or other percentage values, such as 75%) of a nominal load. In another example, the load condition of the genset 102 may be a steady state condition in which the load of the generator 122 is above 70% (or other percentage values, such as 75%) of a nominal load. In some embodiments, the controller 103 (or other components of the generator system 100) may determine whether the load condition of the genset 102 corresponds to a steady state condition in which the load of the generator 122 is below or above a predetermined load threshold value.

In some embodiments, the load condition of the genset 102 may include a transient condition, a start-up condition (e.g., a cold start condition), and/or other types of load conditions. A transient condition may describe a load condition of the genset 102 in which a load of the genset 102 (e.g., a load of the generator) undergoes a transitory change (e.g., a change of +4% of the nominal load) during a certain time instance. The operation or performance of one or more components of the generator system 100, such as the genset 102 or the controller 103, may be changed or adjusted responsive to determining or detecting a transient condition. For example, a load of the genset 102 may change by at least 4% (or other percentage values) of a nominal load on island mode. The controller 103 (or other components of the generator system 100) may detect or identify the change of the load of the genset 102 by determining the change exceeds a predetermined value (e.g., exceeds 4%, or other percentage values, of a nominal load). Responsive to detecting the change (e.g., a change of at least 4% of a nominal load), the controller 103, for instance, may determine that the load condition of the genset 102 corresponds to a transient condition.

In some embodiments, the controller 103 (or other components of the generator system 100) may determine the load condition of the genset 102 corresponds to a start-up condition. The start-up condition may describe a load condition of the genset 102 in which the genset 102 is turned on or used for a first time. In some embodiments, the start-up condition may describe a load condition of the genset 102 in which the operating temperature of the genset 102 (e.g., the generator 122) is below a predetermined temperature value (e.g., 87° C. or other values). The controller 103, for example, may determine the load condition of the genset 102 corresponds to a start-up condition (e.g., a cold start condition) by using information provided by a cold start indicator 312.

Referring now to operation 204, and in some embodiments, the method 200 may include selecting an operating mode from between a first mode and a second mode. For example, the controller 103 (or other components of the generator system 100) may select or identify an operating mode from between a first mode and a second mode responsive to determining the load condition of the genset 102. The first mode may be associated with a first load condition. The second mode may be associated with a second load condition. In some embodiments, the controller 103, for instance, may select the first mode responsive to determining the load condition of the genset 102 is the first load condition. The first load condition may be a steady state condition (or other load conditions) in which a load of the generator 122 is below a predetermined load threshold value, such as 70% (or other percentage values) of a nominal load. In some embodiments, the controller 103 (or other components of the generator system 100) may select the second mode responsive to determining the load condition of the genset 102 is the second load condition. The second load condition may be a steady state condition (or other load conditions) in which a load of the generator 122 is above a predetermined load threshold value, such as 75% (or other percentage values) of the nominal load.

In some embodiments, the method 200 may include selecting an operating mode from between the first mode, the second mode, and a third mode. For example, the controller 103 (or other components of the generator system 100) may select or identify an operating mode from between the first mode, the second mode, and the third mode responsive to determining the load condition of the genset 102. The third mode may be associated with a third load condition. The third load condition may be the transient condition (or other load conditions, such as a start-up condition), in which a load of the genset 102 (e.g., a load of the generator) undergoes a transitory change or fluctuation (e.g., a change of ±4% of the nominal load). The controller 103, for instance, may select the third mode responsive to determining the load condition of the genset 102 is the third load condition. In some embodiments, the controller 103 may select the third mode (e.g., a third mode associated with a transient condition) responsive to determining an operating temperature of the genset 102 (e.g., the outlet coolant temperature) is greater than or equal to a predetermined threshold value (e.g., 87° C. or other temperature values). A cold start indicator 312 may specify whether the operating temperature of the genset 102 (e.g., the outlet coolant temperature) reaches (e.g., meets or exceeds) the predetermined threshold value. Therefore, the controller 103 (or other components of the generator system 100) may select the third mode responsive to receiving or analyzing the information provided by the cold start indicator 312. The controller 103 may use the cold start indicator 312 to determine whether an operating temperature of the genset 102 reaches the predetermined threshold value. Responsive to the determination, the controller 103 may select the third mode.

In some embodiments, the first mode, the second mode, and/or other modes (e.g., a third mode) may be configured to determine a target inlet coolant temperature using one or more control loops. The one or more control loops may be configured as cascaded control loops with at least one analog proportional-integral-derivative (PID), at least one binary PID, and/or an interpolation calculator 302. For example, the first mode and the second mode may be configured to determine a target inlet coolant temperature using a set of control loops. The set of control loops may be configured as cascaded control loops with at least one analog PID and/or at least one binary PID. In some embodiments, the output of the at least one analog PID (e.g., a target inlet coolant temperature) may provide the input (e.g., the set point) for the at least one binary PID. Therefore, the analog PID(s) may correspond to the external control loop(s) of the set of control loops, while the binary PID(s) may correspond to the internal control loop(s). The analog PID(s) may use an outlet coolant temperature (e.g., measured by the one or more outlet temperature sensors 106(1)) and/or a target outlet coolant temperature (e.g., configured or defined based on the engine 120) to determine a target inlet coolant temperature. The binary PID(s) may use the target inlet coolant temperature and/or an inlet coolant temperature (e.g., measured by the one or more inlet temperature sensors 106(2)) to regulate or adjust the operation of the one or more valves 108. By regulating the operation of the one or more valves 108, the binary PID(s) may adjust, regulate, or modify the outlet coolant temperature.

Referring now to operation 206, and in some embodiments, the method 200 may include determining the target inlet coolant temperature using a target outlet coolant temperature and/or the outlet coolant temperature. For instance, the controller 103 (or other components of the generator system 100) may use the selected operating mode (e.g., a first mode or a second mode) to determine the target inlet coolant temperature. The controller 103 may determine the target inlet coolant temperature by using the target outlet coolant temperature and the outlet coolant temperature. For example, the controller 103 (or other components of the generator system 100) may select a first mode responsive to determining that the load condition of the genset 102 corresponds to a first load condition (e.g., a steady state condition in which a load of the generator is below 70% of a nominal load). The controller 103 may use one or more control loops of the first mode (or other operating modes) to determine the target inlet coolant temperature. For instance, the controller 103 may use at least one analog PID of the one or more control loops of the first mode to determine the target inlet coolant temperature. The analog PID may use the target outlet coolant temperature and the outlet coolant temperature to determine the target inlet coolant temperature. The target outlet coolant temperature may be predetermined or configured based on one or more parameters of the engine 120 (e.g., the type or design of an engine 120). For example, the target outlet coolant temperature may be configured to a value of 90° C. (or other temperature values). The outlet coolant temperature can be measured or sensed by one or more temperature sensors 106 at the outlet of the engine 120.

In some embodiments, the method 200 may include determining or adjusting the target inlet coolant temperature using an interpolation calculator 302. For example, the interpolation calculator 302 may determine the target inlet coolant temperature responsive to a determination that the load condition of the genset 102 corresponds to a transient condition. For instance, the controller 103 (or other components of the generator system 100) may select a third mode responsive to determining that the load condition of the genset 102 corresponds to a third load condition (e.g., a transient condition in which the load of the genset 102 changes by at least ±4% of a nominal load). The controller 103 may use one or more control loops of the third mode to determine the target inlet coolant temperature. The one or more control loops of the third mode may include an interpolation calculator 302 and/or a binary PID. For instance, the controller 103 may use the interpolation calculator 302 of the one or more control loops of the third mode to determine the target inlet coolant temperature. The interpolation calculator 302 may use a cold start indicator 312 and the load of the genset 102 to determine the target inlet coolant temperature. For example, the interpolation calculator 302 may use configured values of inlet coolant temperature, corresponding to certain values of the load of the genset 102 (e.g., 0% of a nominal load and 100% of a nominal load), and measured or actual values of the load of the genset 102 to determine the target inlet coolant temperature.

In some embodiments, the interpolation calculator 302 may adjust or determine the target inlet coolant temperature for a period of time. For example, the interpolation calculator 302 may analyze the load of the genset 102 to determine whether the load changes by a certain amount (e.g., ±4% of nominal load value or other amounts). If the interpolation calculator 302 detects a change in the load of the genset 102 (e.g., a transient condition), the interpolation calculator 302 may determine a target inlet coolant temperature. The interpolation calculator 302 can maintain the determined target inlet coolant temperature for a period of time (e.g., 60 seconds after the change in the load of the genset 102 has been detected).

In some embodiments, the cold start indicator 312 may cause the interpolation calculator 302 to determine the target inlet coolant temperature (e.g., using the load of the genset 102). The cold start indicator 312 may provide or specify an indication of whether the target operating temperature of the genset 102 or the outlet coolant temperature reaches (e.g., meets or exceeds) a predetermined temperature threshold value (e.g., 87° C. or other temperature values). In one exemplary embodiment, the interpolation calculator 302 may receive, obtain, or analyze the information provided by the cold start indicator 312. The interpolation calculator 302 may determine the cold start indicator 312 specifies an outlet coolant temperature reaching a predetermined temperature threshold value. Responsive to the determination, the cold start indicator 312 may cause or trigger the interpolation calculator 302 to determine the target inlet coolant temperature. In another example, the interpolation calculator 302 may determine the cold start indicator 312 specifies an outlet coolant temperature that is below the predetermined temperature threshold value. Therefore, the cold start indicator 312 may prevent the interpolation calculator 302 from determining the target inlet coolant temperature. In some embodiments, the interpolation calculator 302 may prevent or reduce temperature overshoots or undershoots during a transient condition.

Referring now to operation 208, and in some embodiments, the method 200 may include regulating the outlet coolant temperature based on the determined target inlet coolant temperature and/or the inlet coolant temperature. The outlet coolant temperature may be regulated by adjusting or controlling an operation of one or more coolant valves 108. For example, the controller 103 (or other components of the generator system 100) may adjust an operation of one or more valves 108, thereby regulating the outlet coolant temperature. In some embodiments, one or more control loops of an operating mode (e.g., a first mode, a second mode, or a third mode) may be used (e.g., used by the controller 103 or the control module 118) to regulate the outlet coolant temperature and/or adjust the operation of the one or more valves 108. For example, the controller 103 (or other components) may use at least one binary PID (or other PIDs) of the one or more control loops of the selected operating mode to regulate the outlet coolant temperature. The at least one binary PID may regulate the outlet coolant temperature based on a determined target inlet coolant temperature and/or a measured inlet coolant temperature.

At least one analog PID (e.g., an analog PID of a first mode or a second mode) or an interpolation calculator 302 may determine the target inlet coolant temperature used by the at least one binary PID. One or more temperature sensors 106 (e.g., one or more inlet temperature sensors 106) may provide or specify the measured inlet coolant temperature to the at least one binary PID (e.g., via the input/output interface 131 of the controller 103). The at least one binary PID may use the determined target inlet coolant temperature and the measured inlet coolant temperature to adjust the operation of the one or more coolant valves 108. For example, the at least one binary PID may adjust the operation of the one or more coolant valves 108 by sending or transmitting an "open or close" signal to the one or more coolant valves 108. The signal may cause the valves 108 to open or close, thereby controlling, adjusting, or modifying the flow of coolant through the radiator 110 or the engine 120. By controlling or adjusting the flow of coolant, the controller 103 may use the at least one binary PID (in addition to the analog PID and the interpolation calculator 302) to regulate the outlet coolant temperature.

Figure 3:
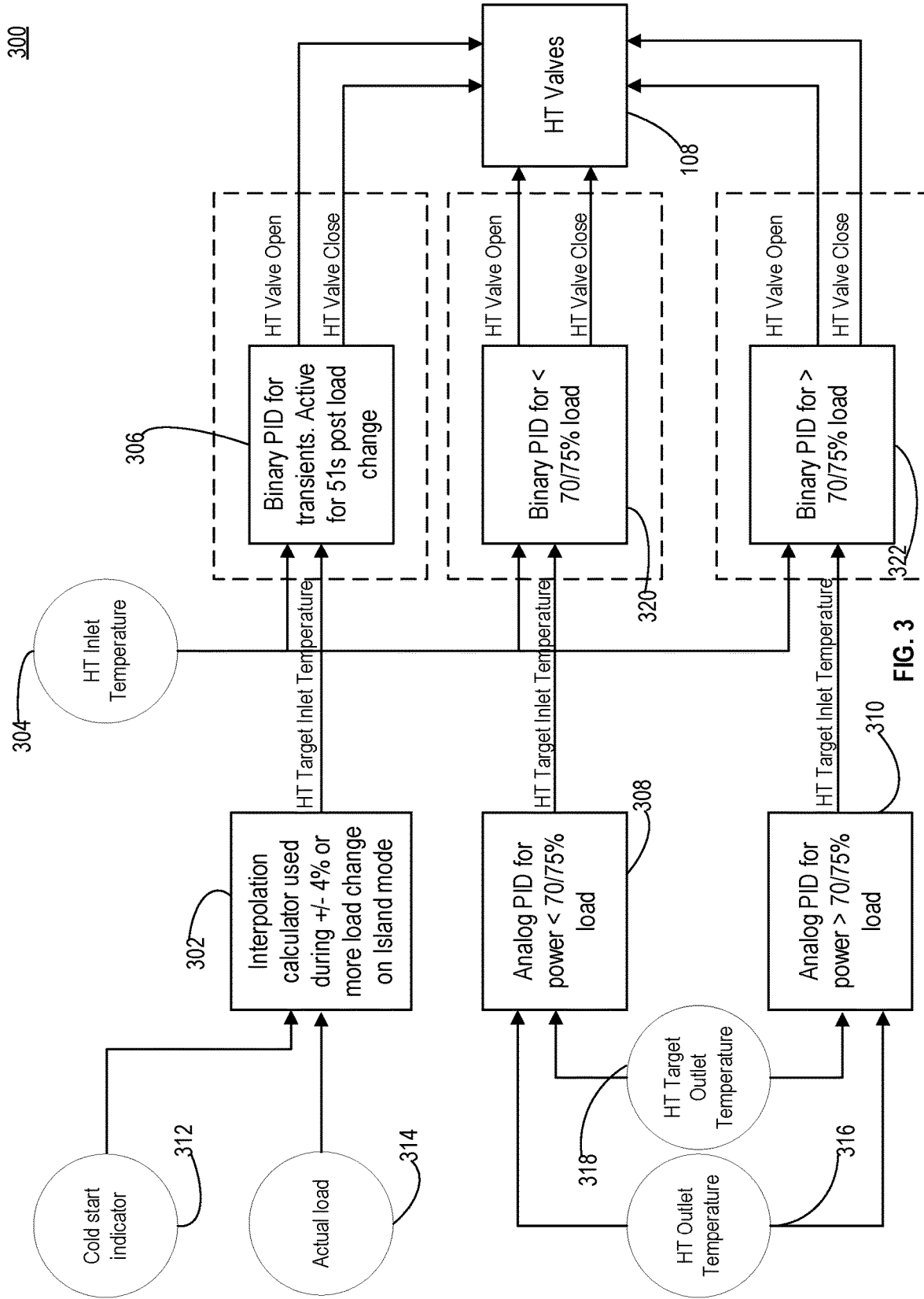
FIG. 3 is a block diagram illustrating a system for regulating an outlet coolant temperature of a genset and an inlet coolant temperature of the genset, according to an exemplary embodiment.
Figure 4A:
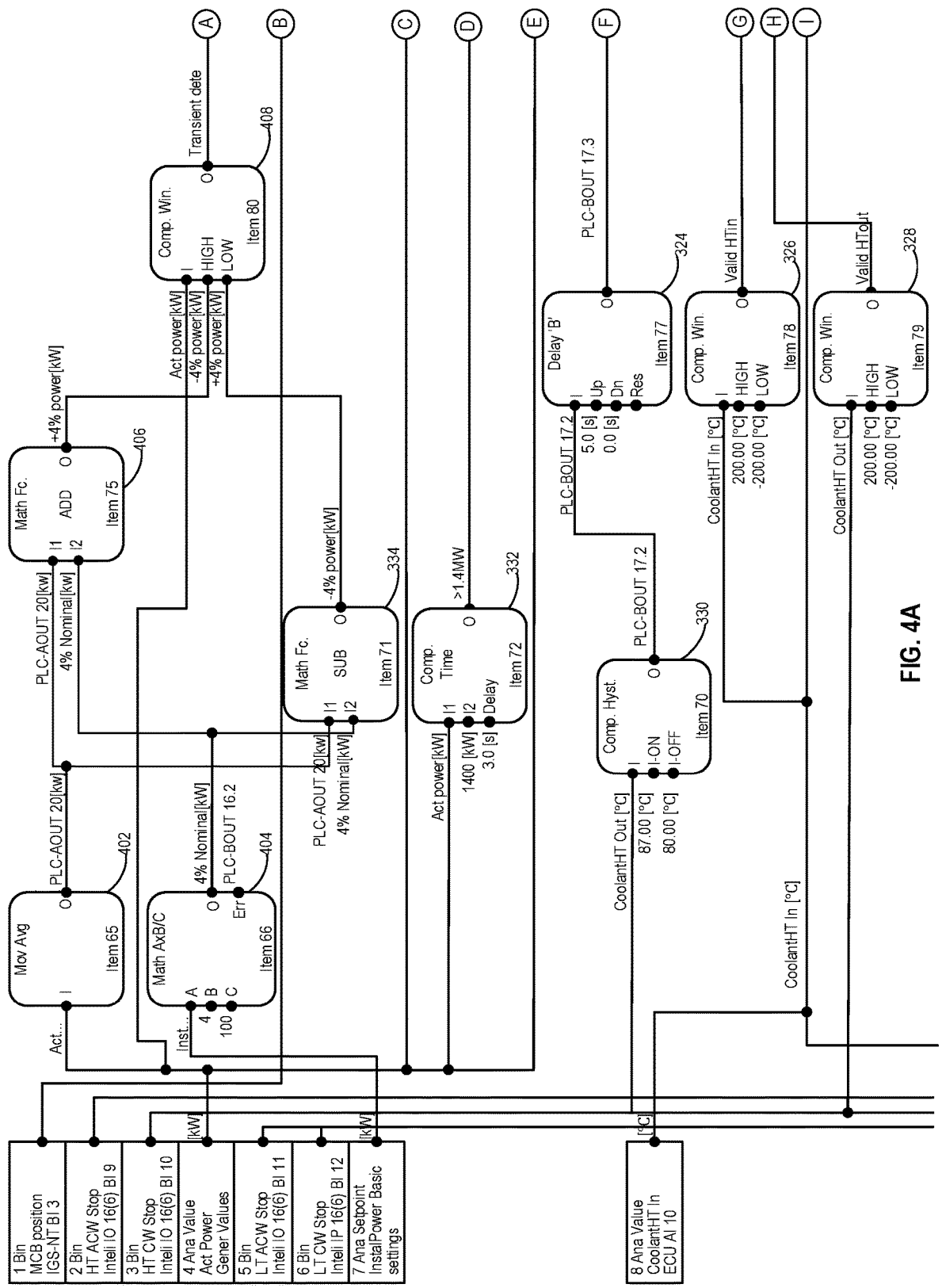
FIGS. 4A-4E depict separate parts of a logic for regulating an outlet coolant temperature of a genset and an inlet coolant temperature of the genset, according to an exemplary embodiment.
Figure 4B:
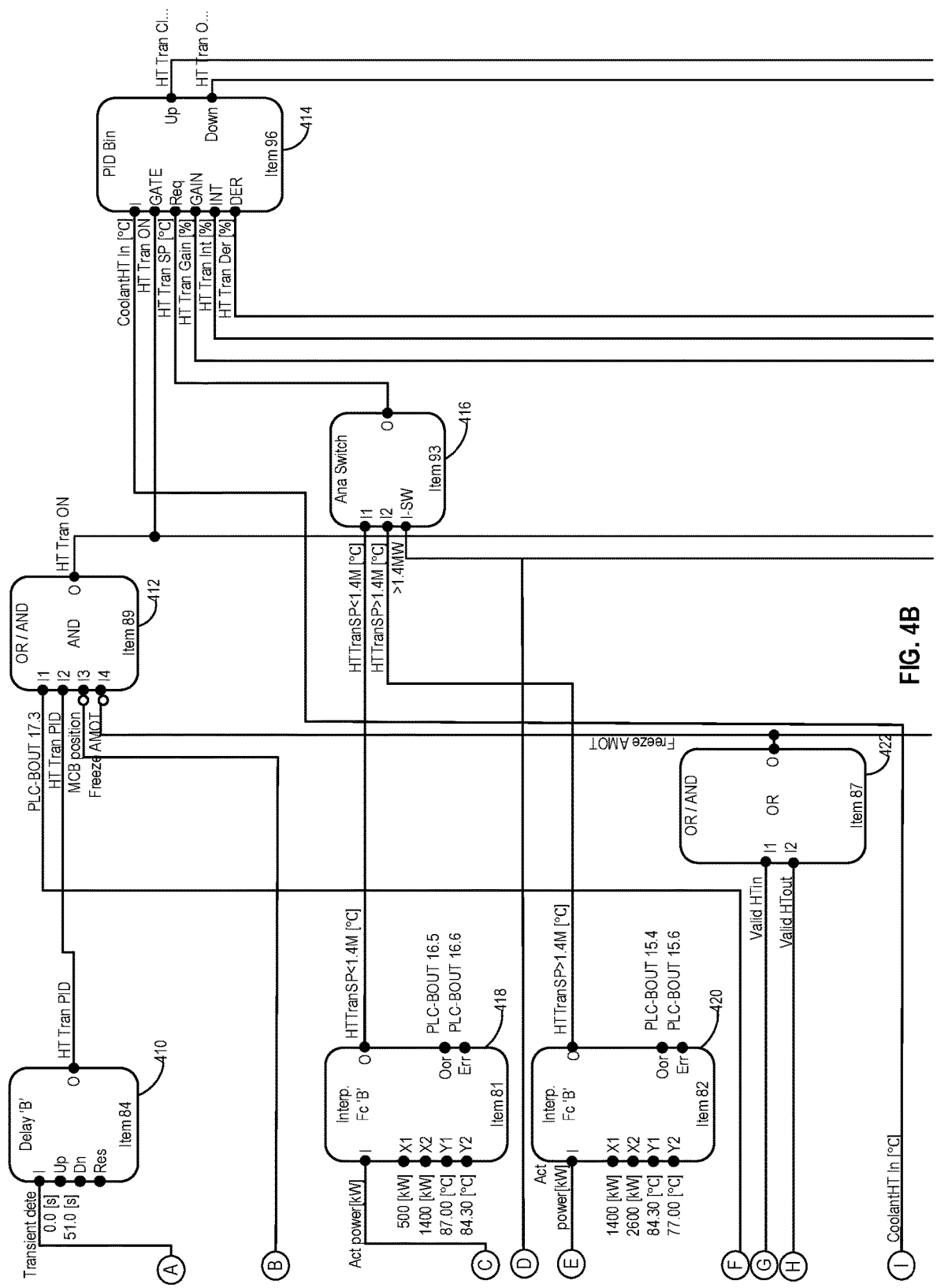
Figure 4C:
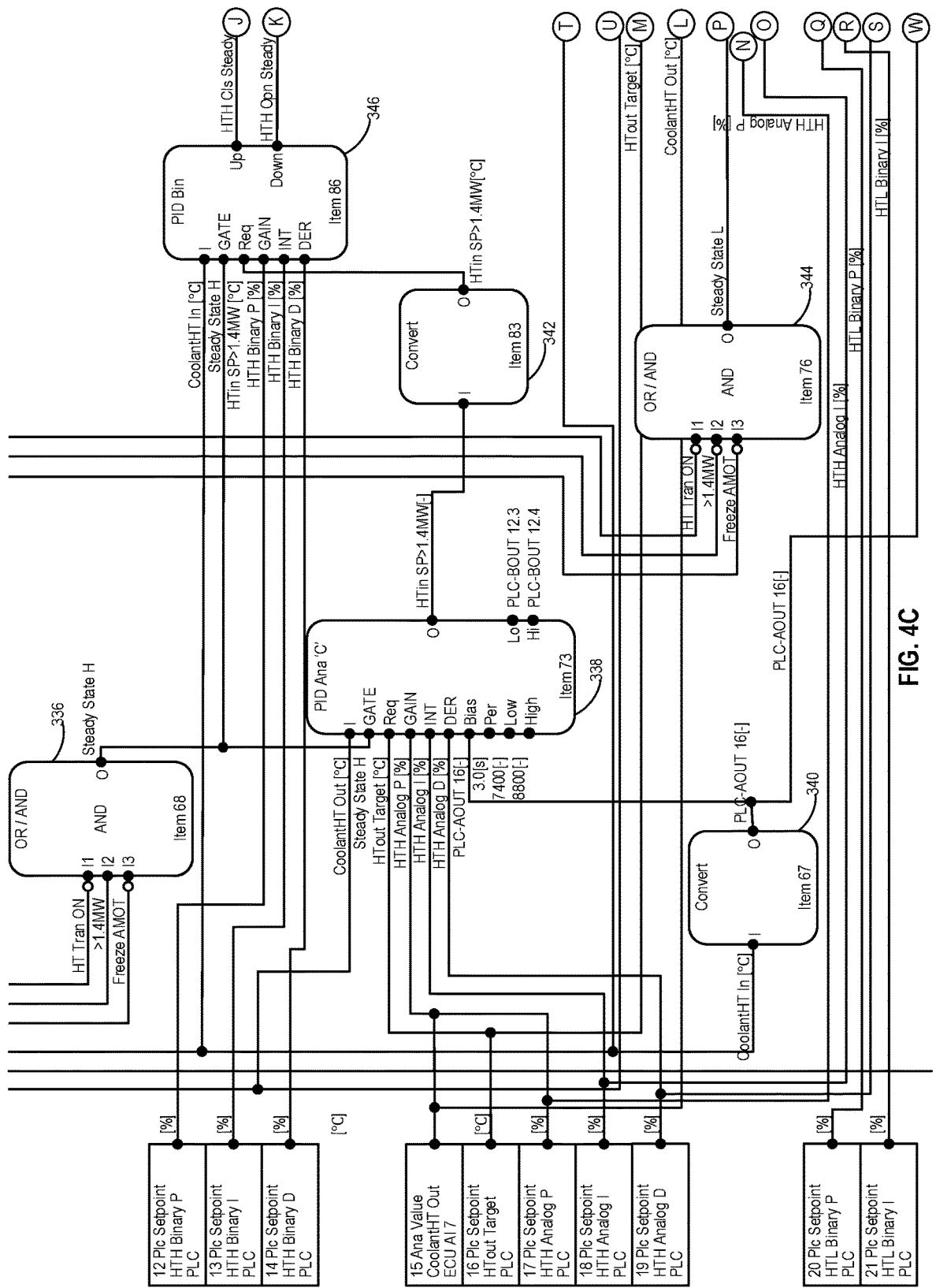
Figure 4D:
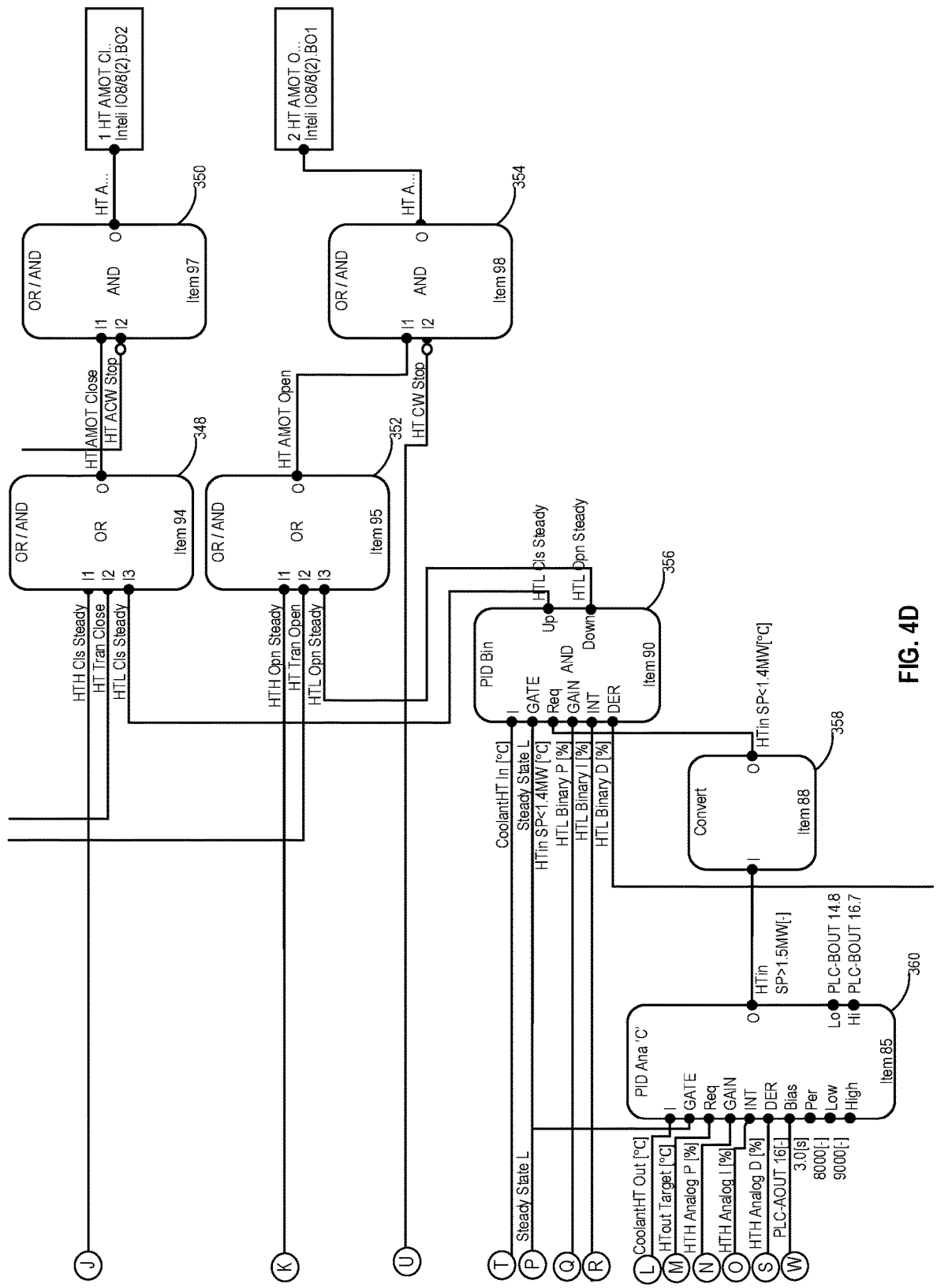
Figure 4E:
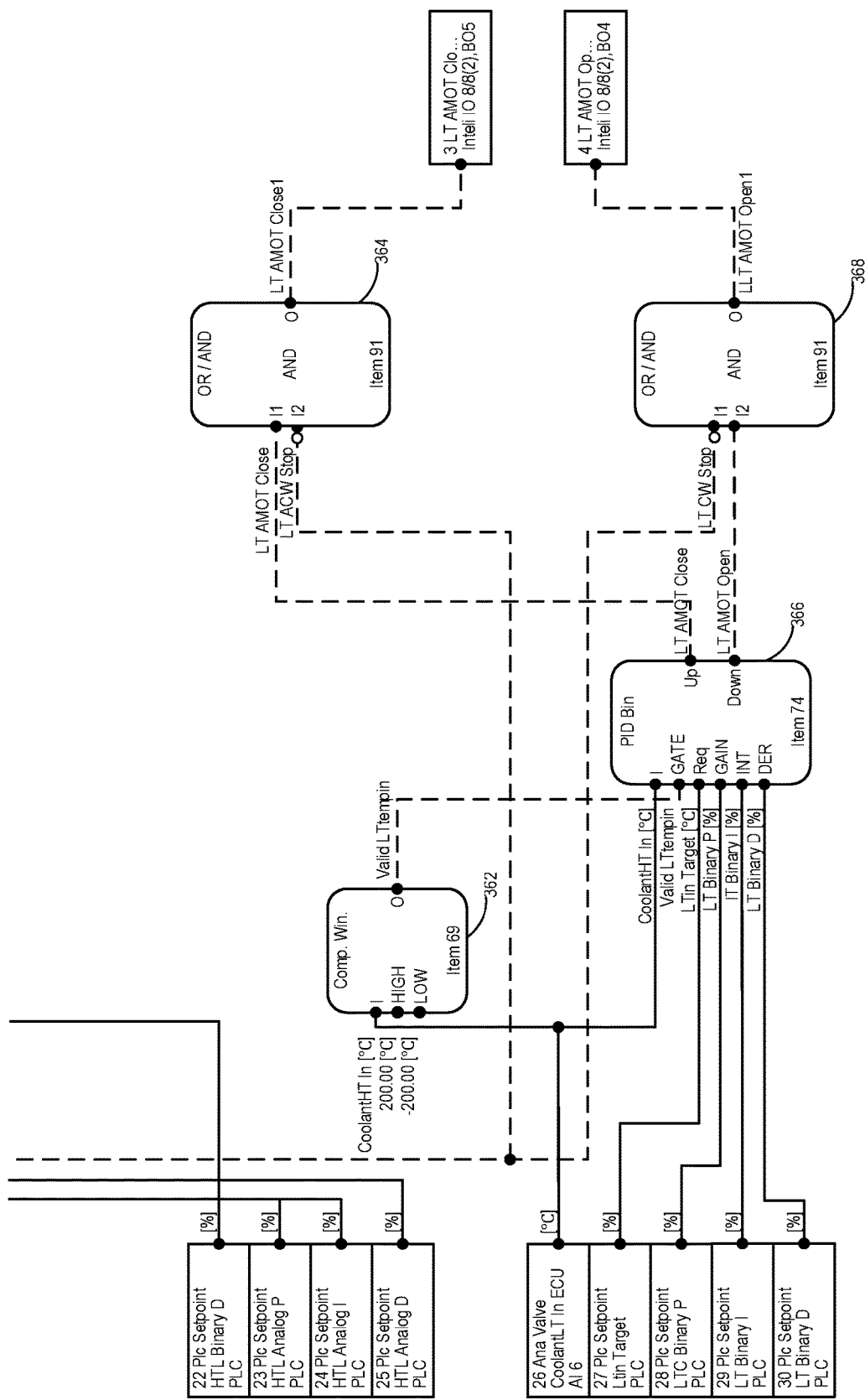

Referring to FIG. 3, a block diagram illustrating a system 300 for regulating an outlet coolant temperature of a genset 102 and an inlet coolant temperature of the genset 102 according to an exemplary embodiment is shown. In the illustrated embodiment, the system 300 includes one or more analog PIDs, one or more binary PIDs, an interpolation calculator 302, and/or one or more valves 108. In some embodiments, the system 300 may be used to determine a load condition of the genset 102. The controller 103, for instance, may determine the load condition of the genset 102 by using the interpolation calculator 302. In some embodiments, the controller 103 may determine the load condition of the genset 102 by analyzing the actual load of the genset 314. For example, the controller 103 (or other components of the generator system 100) may use the interpolation calculator 302 to determine whether the load of the genset 102 undergoes a transitory change (e.g., a change of at least ±4% of a nominal load). The interpolation calculator 302 may determine the load condition of the genset 102 is a transient condition if the interpolation calculator 302 detects a transitory change.

In some embodiments, the controller 103, for example, may determine the load condition of the genset 102 by using at least one of the analog PIDs. The controller 103 (or other components of the generator system 100) may use at least one of the analog PIDs (or the interpolation calculator 302) to determine whether the load of the genset 102 is above or below a predetermined load threshold value (e.g., 70% of a nominal load or other percentage values). At least one of the analog PIDs may determine the load condition of the genset 102 is a steady state condition if the controller 103 (e.g., the analog PID(s)) determines the load of the genset 102 is above or below the predetermined load threshold value. For example, the controller 103 may determine the load condition of the genset 102 is a first load condition, wherein the first load condition is a steady state condition in which the load of the genset 102 is below the predetermined load threshold value. In another example, the controller 103 may determine the load condition of the genset 102 is a second load condition, wherein the second load condition is a steady state condition in which the load of the genset 102 is above the predetermined load threshold value.

Responsive to determining the load condition of the genset 102, the system 300 may be used to select an operating mode. The system 300 may be used to select an operation mode from between a first mode, a second mode, and/or other modes (e.g., a third mode). The first mode may be associated with the first load condition (e.g., a steady state condition in which the load of the genset 102 is below the predetermined load threshold value). The second mode may be associated with the second load condition (e.g., a steady state condition in which the load of the genset 102 is above the predetermined load threshold value). For example, the controller 103 (or other components of the generator system 100) may select the first mode as the operating mode. The controller 103 may select the first mode responsive to determining the load condition of the genset 102 corresponds to the first load condition. In another example, the controller 103 (or other components of the generator system 100) may select the second mode as the operating mode. The controller 103 may select the second mode responsive to determining the load condition of the genset 102 corresponds to the second load condition. In yet another example, the controller 103 (or other components of the generator system 100) may select the third mode as the operating mode. The controller 103 may select the third mode responsive to determining the load condition of the genset 102 corresponds to a third load condition, wherein the third load condition is a transient condition.

In some embodiments, the first mode, the second mode, and/or other modes may be configured to determine a target inlet coolant temperature using one or more control loops. For example, the first mode may be configured to determine the target inlet coolant temperature using a first set of one or more control loops. The second mode, for instance, may be configured to determine the target inlet coolant temperature using a second set of one or more control loops. The first set of one or more control loops may include a first analog PID 308, a first binary PID 320, and/or other components. The second set of one or more control loops may include a second analog PID 310, a second binary PID 322, and/or other components. The first set and the second set of one or more control loops may be configured as cascaded control loops. For instance, the output of the first analog PID 308 and the second analog PID 310 may provide the input (e.g., the set point) for the first binary PID 320 and the second binary PID 322. Therefore, the analog PIDs may correspond to the external control loop of each of the cascaded control loops, while the binary PIDs may correspond to the internal control loop. In some embodiments, the third mode may be configured to determine the target inlet coolant temperature using a third set of one or more control loops. The third set of one or more control loops may include an interpolation calculator 302, a third binary PID 306, and/or other components. The output of the interpolation calculator 302 may provide the input (e.g., the set point) for the third binary PID 306.

In some embodiments, the system 300 may be used to determine the target inlet coolant temperature using the target outlet coolant temperature 318 and/or the outlet coolant temperature 316. The system 300, for instance, may use the selected operating mode (e.g., the first mode, the second mode, and/or the third mode) to determine the target inlet coolant temperature. For example, the controller 103 (or other components of the generator system 100) may use the first mode or the second mode to determine the target inlet coolant temperature. Responsive to selecting the first mode or the second mode, the controller 103 may use the first set or the second set of one or more control loops to determine the target inlet coolant temperature. Specifically, the controller 103 may use at least one analog PID (e.g., the first analog PID 308 and/or the second analog PID 310) to determine the target inlet coolant temperature responsive to selecting the first mode or the second mode. The at least one analog PID (e.g., the first analog PID 308 and/or the second analog PID 310) may determine or calculate the target inlet coolant temperature using the target outlet coolant temperature 318 and/or the outlet coolant temperature 316. Therefore, the target outlet coolant temperature 318 and the outlet coolant temperature 316 can be the inputs to the at least one analog PID, while the determined target inlet coolant temperature may be the output of the analog PID(s).

In some embodiments, the first analog PID 308 may determine or calculate the target inlet coolant temperature responsive to selecting the first mode. In some embodiments, the second analog PID 310 may determine the target inlet coolant temperature responsive to selecting the second mode. For example, the controller 103 may determine the load condition of the genset 102 corresponds to the first load condition (or the second load condition), wherein the first load condition is the steady state condition in which the load of the generator 122 is below the predetermined load threshold value (e.g., 70% of a nominal load, 75% of a nominal load, and/or other values). Responsive to selecting the first mode (or the second mode), the controller 103 may use the first set (or the second set) of one or more control loops to determine the target inlet coolant temperature. Furthermore, the first analog PID 308 (or the second analog PID 310) can be used to determine the target inlet temperature based on the target outlet coolant temperature 318 and the outlet coolant temperature 316. The one or more temperature sensors 106 can measure and provide the outlet coolant temperature 316 to the controller 103 (or other components of the generator system 100 that determine the target inlet coolant temperature). The target outlet coolant temperature 318 can be configured or predetermined according to one or more parameters of the engine 120.

In some embodiments, the first analog PID 308 and the second analog PID 310 may be optimized or configured to determine the target inlet coolant temperature at different loads (e.g., the first analog PID 308 and the second analog PID 310 may have different gains). For example, the first analog PID 308 may be configured to determine the target inlet coolant temperature if the load of the genset 102 is a steady state load below the predetermined load threshold value (e.g., below 70% of a nominal load). In another example, the second analog PID 310 may be configured to determine the target inlet coolant temperature if the load of the genset 102 is a steady state load above the predetermined load threshold value (e.g., above 70% of a nominal load).

In some embodiments, the interpolation calculator 302 may determine or calculate the target inlet coolant temperature responsive to selecting the third mode. For example, the controller 103 may determine the load condition of the genset 102 corresponds to the third load condition, wherein the third load condition is a transient condition in which the load of the genset 102 changes by at least ±4% (or other percentage values) of a nominal load. Responsive to selecting the third mode, the controller 103 may use the third set of one or more control loops to determine the target inlet coolant temperature. Furthermore, the interpolation calculator 302 can be used to determine the target inlet temperature based on the cold start indicator 312 and/or the actual load 314 of the genset 102. For example, the cold start indicator 312 may cause the interpolation calculator 302 to determine (e.g., based on the actual load 314) and maintain the target inlet coolant temperature (e.g., maintain for at least 60 seconds after a change in load is detected, or other time instances). The cold start indicator 312 may cause the interpolation calculator 302 to determine the target inlet coolant temperature if the outlet coolant temperature 316 meets or exceeds a certain temperature value (e.g., 87° C. or other temperature values).

In some embodiments, the system 300 may be used to regulate the outlet coolant temperature 316 based on the determined target inlet coolant temperature and the inlet coolant temperature 304. The system 300 may regulate the outlet coolant temperature 316 by adjusting or modifying an operation of one or more coolant valves 108 (e.g., HT valves or AMOT valves). The system 300, for instance, may use the selected operating mode (e.g., the first mode, the second mode, and/or the third mode) to regulate the outlet coolant temperature 316. For example, the controller 103 (or other components of the generator system 100) may use the first mode, the second mode, or the third mode to regulate the outlet coolant temperature 316. Responsive to selecting the first mode, the second mode or the third mode, the controller 103 may use the first set, the second set, or the third set of one or more control loops to regulate the outlet coolant temperature 316. Specifically, the controller 103 may use at least one binary PID (e.g., the first binary PID 320, the second binary PID 322, and/or the third binary PID 306) to regulate the outlet coolant temperature 316 responsive to selecting the first mode, the second mode, or the third mode. The at least one binary PID may regulate the outlet coolant temperature 316 by using the determined target inlet coolant temperature and/or the inlet coolant temperature 304. Therefore, the determined target inlet coolant temperature and the inlet coolant temperature 304 can be the inputs to the at least one binary PID. The one or more temperature sensors 106 can measure and provide the inlet coolant temperature 304 to the controller 103 (or other components of the generator system 100 that regulate the outlet coolant temperature 316).

In some embodiments, the first binary PID 320, the second binary PID 322, and/or the third binary PID 306 may be optimized or configured to adjust the operation of the one or more valves 108 at different loads (e.g., the PIDs may have different gains). For example, the first binary PID 320 may be configured to adjust the operation of the one or more valves 108 if the load of the genset 102 is a steady state load below the predetermined load threshold value (e.g., below 70% of a nominal load). In another example, the second binary PID 322 may be configured to adjust the operation of the one or more valves 108 if the load of the genset 102 is a steady state load above the predetermined load threshold value (e.g., above 70% of a nominal load). In yet another example, the third binary PID 306 may be configured to adjust the operation of the one or more valves 108 if the load of the genset 102 is transient. The third binary PID 306 can adjust the operation of the one or more valves 108 for a certain period of time, such as 51 seconds (or other time instances) after the load of the genset 102 changes. At least one binary PID may adjust or modify the operation of the one or more valves 108 by sending a signal or command to the one or more valves 108. The signal or command may include an "open or close" signal, wherein the signal causes the one or more valves 108 to "open" or "close". By causing the one or more valves 108 to "open" or "close", the at least one binary PID can regulate the outlet coolant temperature 316 by adjusting the amount or flow of coolant through the generator system 100 (e.g., the engine 120 or the radiator 110).

FIG. 4 illustrates a logic diagram of a process 400 for regulating an outlet coolant temperature of a genset 102 and an inlet coolant temperature of the genset 102, according to an exemplary embodiment. FIG. 4 includes FIGS. 4A-4E, wherein FIGS. 4A-4E illustrate separate parts of a logic for regulating the outlet coolant temperature and the inlet coolant temperature. The circled letters at one end of a line/connector (e.g., a circled letter "A", a circled letter "B", or others) indicate corresponding connections or continuations between lines. One or more parts of FIG. 1 may be referenced for purposes of demonstration while discussing FIG. 4. The logic of FIG. 4 can monitor or determine a load condition of the genset 102 and provide an output (e.g., logical binary output) that adjusts an operation of one or more valves 108 (e.g., AMOT valves). In some embodiments, the controller 103, the control module 118, or other components of the generator system 100 can implement the logic illustrated in FIG. 4.

In some embodiments, element 402 of the logic diagram can calculate a moving average (or other types of averages) of a plurality of actual active power values. Element 402 may calculate the moving average within a time period of 500 ms (or other time instances). Element 404 of the logic diagram may determine or calculate a percentage value of the nominal load of the genset 102. For example, element 404 may calculate a value that corresponds to 4% (or other percentages) of the nominal load of the genset 102. The value calculated by element 404 can be used to identify or determine that the load condition of the genset 102 is a transient condition. Elements 334 and 406 of the logic diagram may determine or calculate a tolerance band (e.g., a range of values) around the moving average (e.g., calculated by element 402). Element 406 may calculate the upper limit of the tolerance band by adding (or performing other operations) the 4% of the nominal load of the genset 102 (e.g., calculated by element 404) and the corresponding average value of the moving average (e.g., calculated by element 402). Element 334 may determine the lower limit of the tolerance band by subtracting (or performing other operations) the 4% of the nominal load of the genset 102 and the corresponding average value of the moving average. Elements 404, 406, and 334 may determine their respective values using one or more operations other than the ones shown in FIG. 3.

In some embodiments, element 408 of the logic diagram may compare the values determined by elements 406 and 334 with the current value of the actual active power (e.g., the load of the genset 102). Therefore, element 408 may determine or identify a transient change in the load of the genset 102. For example, if the current value of the actual active power is outside of the range of values established by the tolerance band, element 408 may detect a transient change in the load of the genset 102. If element 408 identifies the transient change, element 410 of the logic diagram may store the detection for a certain period of time (e.g., 51 seconds or other time instances). Storing the detection for the certain period of time may activate or enable the transient binary PID (e.g., the third binary PID 306).

In some embodiments, element 330 of the logic diagram may determine or verify whether the genset 102 has started operating from a hot start condition or a cold start condition. Cold starting a genset 102 generally includes starting a genset 102 that has a cold exhaust which has not been run for a predetermined time (e.g., greater than 12 hours) due to the genset 102 being shut down. Element 330 may determine the starting condition of the genset 102 (e.g., hot start or cold start) by monitoring or analyzing the outlet coolant temperature. For instance, if the outlet coolant temperature is above a certain temperature value (e.g., 87° C. or other values), element 330 may provide an output (e.g., a logical binary output of 1). If the output of element 330 is continuously active for a certain time interval (e.g., 5 seconds or other time intervals), element 324 of the logic diagram may provide an output. Therefore, element 324 may ensure or confirm the outlet coolant temperature is above the certain temperature value (e.g., 87° C. or other values) for the duration established by the certain time interval (e.g., the engine 120 is "hot").

In some embodiments, element 412 of the logic diagram may activate or inactive the transient binary PID (e.g., the third binary PID 306). For example, element 412 may activate or enable the transient binary PID (e.g., element 414 of the logic diagram) if one or more conditions are met. The one or more conditions may include a "hot" engine 120 (e.g., using the output of element 324), valid outlet coolant temperature measurements (e.g., failing to detect a sensor failure using element 422), an active transient load condition (e.g., a load change of +/−4% of a nominal load) and/or a current application of the process 400 corresponding to an island application. Element 414 of the logic diagram may correspond to the transient binary PID (e.g., the third binary PID 306). The output of element 412 may activate or enable element 414. For example, if the one or more conditions are met, element 412 may activate the transient binary PID. In some embodiments, elements 418 and 420 of the logic diagram may provide or determine the target inlet coolant temperature used by the transient binary PID (e.g., element 414) to adjust an operation of one or more valves 108. Elements 418 and 420 may include or correspond to the interpolation calculator 302.

In some embodiments, element 332 of the logic diagram can detect or determine whether the load of the genset 102 is above or below a predetermined load threshold value (e.g., 1,400 kW or other values). Using the result of the detection from element 332, element 416 of the logic diagram may select a target inlet coolant temperature from between the target inlet coolant temperature calculated by element 418 and the target inlet coolant temperature calculated by element 420. Element 416 may provide the selected target inlet coolant temperature to element 414 (e.g., the transient binary PID). Element 414 may use the selected target inlet coolant temperature provided by element 416 to adjust the operation of one or more valves 108 (e.g., regulate the outlet coolant temperature).

In some embodiments, elements 326 and 328 can monitor or analyze the inlet and outlet coolant temperature values provided by the control module 118 (or other components of the generator system 100). If the one or more temperature sensors 106 fail to communicate accurate temperature values to the control module 118, the control module 118 may provide, specify, or indicate inaccurate temperature values. Therefore, elements 326 and 328 may identify or determine whether the temperature values provided by the control module 118 are inaccurate (e.g., out of a predefined temperature range). If elements 326 and 328 determine the temperature values of the control module 118 are inaccurate, elements 326 and 328 may inform or notify element 422 of the result of the determination. Responsive to receiving a notification of inaccurate temperature values from elements 326 and 328, element 422 may "freeze" or inactivate the PID loops. By inactivating the PID loops, element 422 can maintain the operation of the one or more valves 108 at their current operation (e.g., the last known position of the one or more valves 108).

In some embodiments, element 338 of the logic diagram may include or correspond to an analog PID (e.g., the second analog PID 310). Element 338 may determine or calculate a target inlet coolant temperature based on the outlet coolant temperature and the target outlet coolant temperature. Element 336 of the logic diagram may activate or enable element 338. Element 336 can activate or enable elements 338 and 346 of the logic diagram according to the outputs of elements 412, 422, and 332. For example, element 336 may enable elements 338 and 346 if the load of the genset 102 is above a predetermined load threshold value (e.g., 1,400 kW or other loads), the transient PID(s) (e.g., the third binary PID 306) are inactive, and/or the temperature values provided by the one or more sensors 106 (e.g., the inlet and outlet coolant temperatures) are valid. In some embodiments, element 346 of the logic diagram may include or correspond to a binary PID (e.g., the second binary PID 322). Element 346 may analyze or monitor the target inlet coolant temperature (e.g., provided by element 338) to adjust the operation of the one or more valves 108. Responsive to adjusting the operation of the one or more valves 108, element 346 may regulate the outlet coolant temperature. In some embodiments, element 342 may transform or convert the target inlet coolant temperature (e.g., provided by element 338) into the proper decimal values. Element 342 of the logic diagram can specify the transformed target inlet coolant temperature to element 346 (e.g., the binary PID).

In some embodiments, element 340 of the logic diagram may provide one or more values of inlet coolant temperature as bias values to elements 338 and 360. The bias values may include or correspond to the output values of elements 338 and 360 (e.g., target inlet coolant temperature values) when elements 338 and 360 (e.g., the analog PIDs) are inactive or disabled. In some embodiments, element 360 of the logic diagram may include or correspond to an analog PID (e.g., the first analog PID 308). Element 360 may determine or calculate a target inlet coolant temperature based on the outlet coolant temperature and the target outlet coolant temperature. Element 344 of the logic diagram may activate or enable element 360. Element 344 can activate or enable elements 360 and 356 of the logic diagram according to the outputs of elements 412, 422, and 332. For example, element 344 may enable elements 360 and 356 if the load of the genset 102 is below a predetermined load threshold value (e.g., 1,400 kW or other loads), the transient PID(s) are inactive, and/or the temperature values provided by the one or more sensors 106 are valid. In some embodiments, element 356 of the logic diagram may include or correspond to a binary PID (e.g., the first binary PID 320). Element 356 may analyze or monitor the target inlet coolant temperature (e.g., provided by element 360) to adjust the operation of the one or more valves 108. Responsive to adjusting the operation of the one or more valves 108, element 356 may regulate the outlet coolant temperature.

In some embodiments, element 348 of the logic diagram may receive, monitor, or analyze one or more "close" commands or signals for the one or more valves 108. Element 348 may receive or obtain the "close" command(s) from one or more PIDs (e.g., elements 414, 356, and/or 346). In one example, element 348 may provide or transmit the received "close" signal(s) to the one or more valves 108. Responsive to receiving the "close" signal(s), the one or more valves 108 may change or adjust the operation of the valve(s) 108 to "close" (e.g., closing one or more AMOT valves). In some embodiments, element 352 of the logic diagram may receive, monitor, or analyze one or more "open" commands or signals for the one or more valves 108. Element 352 may receive or obtain the "open" command(s) from one or more PIDs (e.g., elements 414, 356, and/or 346). In one example, element 352 may provide or transmit the received "open" signal(s) to the one or more valves 108. Responsive to receiving the "open" signal(s), the one or more valves 108 may change or adjust the operation of the valve(s) 108 to "open" (e.g., opening one or more AMOT valves). In some embodiments, elements 350 and 354 of the logic diagram can monitor or analyze the output from elements 348 and 352. Elements 350 and 354 may ensure the operation of the one or more valves 108 are not driven past a "fully closed" or a "fully open" operating condition.

Figure 5:
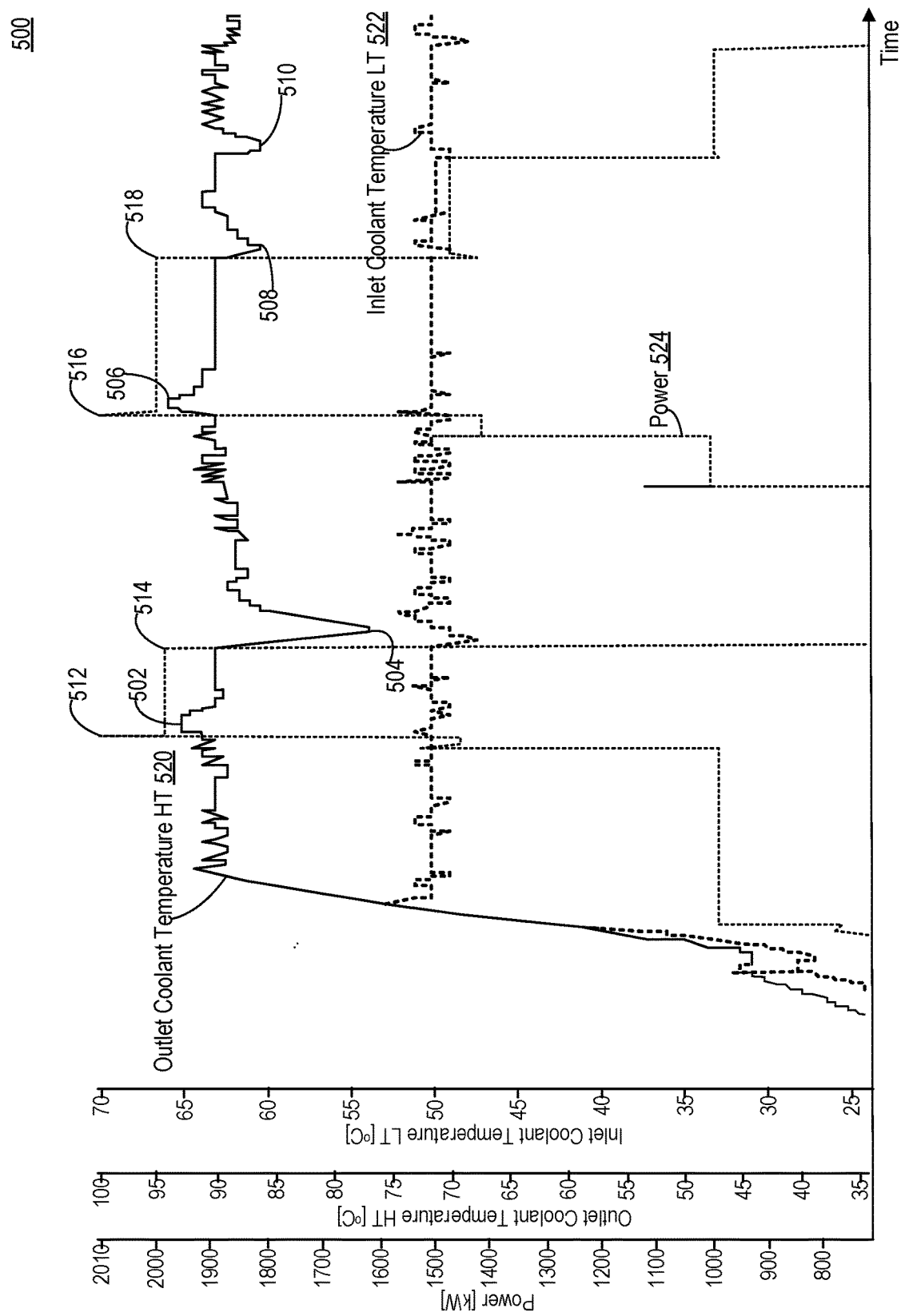
FIG. 5 is a graph illustrating the fluctuations of the outlet coolant temperature of the genset in response to changes in the load of the genset, according to an exemplary embodiment.

FIG. 5 illustrates a graph 500 representing the fluctuations of the outlet coolant temperature of the genset 102 in response to changes in the load of the genset 102, according to an exemplary embodiment. The graph 500 includes a y-axis indicating values for the outlet coolant temperature curve 520 (in units of Celsius), a y-axis indicating values for a low temperature (LT) inlet coolant temperature curve 522 (in units of Celsius), a y-axis indicating values for a power curve 524 (in units of kW), and an x-axis indicating time. The graph 500 illustrates the response of the outlet coolant temperature of the genset 102 to changes in the load of the genset 102 (e.g., the load condition of the genset 102 is a transient condition). Points 512, 514, 516, and 518 of the power curve 524 may indicate changes in the load of the genset 102. In this exemplary embodiment, the outlet coolant temperature of the genset 102 can be regulated based on a determined target inlet coolant temperature and the inlet coolant temperature. During a transient condition (e.g., points 512, 514, 516, and 518), the target inlet coolant temperature can be determined without an interpolation calculator 302 (e.g., determined using a controller 103). Therefore, the outlet coolant temperature may be regulated (e.g., during a transient condition) according to one or more target inlet coolant temperature values, wherein the target inlet coolant temperature values are determined without the interpolation calculator 302. As a result, the changes in the load of the genset 102 (e.g., points 512, 514, 516, 518, or other points) may cause or trigger temperature overshoots or undershoots in the regulated outlet coolant temperature. For example, points 502, 504, 506, 508, and 510 of the outlet coolant temperature curve 520 may indicate the temperature overshoots and undershoots of the regulated outlet coolant temperature. The overshoots of the outlet coolant temperature can be caused by the controller 103. The controller 103 may be unable to determine the target inlet coolant temperature until the load of the genset 102 is in a steady-state condition.

In some embodiments, the interpolation calculator 302 can be used to determine the target inlet coolant temperature during changes in the load of the genset 102 (e.g., a transitory condition with changes of at least ±4% in the load). The outlet coolant temperature may be regulated using the determined target inlet coolant temperature (e.g., determined by the interpolation calculator 302) and the inlet coolant temperature. By using the interpolation calculator 302 to determine the target inlet coolant temperature (e.g., during a transient condition, such as points 512, 514, 516, and 518), the interpolation calculator 302 may prevent the temperature overshoots and undershoots illustrated in the outlet coolant temperature curve 520 (e.g., points 502, 504, 506, 508, and 510). The interpolation calculator 302 (or other components of the generator system 100) may analyze the load of the genset 102 to detect changes in the load (e.g., a transient condition). Responsive to detecting the changes, the interpolation calculator 302 may use the actual load 314 of the genset 102 to determine the target inlet coolant temperature. The target inlet coolant temperature determined by the interpolation calculator 302 can be used to regulate the outlet coolant temperature during a transient condition, thereby preventing changes, oscillations, or fluctuations in the regulated outlet coolant temperature.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of regulating an outlet coolant temperature of a genset and an inlet coolant temperature of the genset, the genset comprising an engine, a generator, and at least one controller, the method comprising:
   determining a load condition of the genset;
   selecting an operating mode from between a first mode associated with a first load condition and a second mode associated with a second load condition responsive to determining the load condition of the genset, wherein the first mode and the second mode are configured to determine a target inlet coolant temperature using one or more control loops;
   determining, using the selected operating mode, the target inlet coolant temperature using a difference between the target outlet coolant temperature and the outlet coolant temperature; and
   regulating the outlet coolant temperature based on the determined target inlet coolant temperature and the inlet coolant temperature by adjusting an operation of one or more coolant valves.

2. The method of claim 1, wherein selecting the operating mode comprises:
selecting the first mode responsive to determining the load condition of the genset is the first load condition,
wherein the first load condition is a steady state condition in which a load of the generator is below a predetermined load threshold value.

3. The method of claim 1, wherein selecting the operating mode comprises:
selecting the second mode responsive to determining the load condition of the genset is the second load condition,
wherein the second load condition is a steady state condition in which a load of the generator is above a predetermined load threshold value.

4. The method of claim 1, further comprising:
determining the load condition of the genset is a transient condition in which a load of the generator undergoes a transitory change,
wherein the transitory change comprises a change of at least 4% of a nominal load value.

5. The method of claim 4, further comprising:
determining the load condition of the genset is a start-up condition in which the generator is turned on for a first time and/or an operating temperature of the generator is below a predetermined temperature threshold value,
wherein determining the load condition of the genset is the start-up condition is based on information provided by a cold start indicator.

6. The method of claim 5, further comprising:
adjusting the target inlet coolant temperature for a period of time using an interpolation calculator responsive to determining the load condition of the genset corresponds to the transient condition,
wherein the interpolation calculator is configured to adjust the target inlet coolant temperature using at least one of: the cold start indicator or the load of the generator,
wherein the cold start indicator comprises an indication of whether the outlet coolant temperature reaches the predetermined temperature threshold value.

7. The method of claim 6, further comprising:
determining the target inlet coolant temperature using at least one of a plurality of analog proportional-integral-derivative (PID) control loops, a plurality of binary PID control loops, and the interpolation calculator,
wherein the interpolation calculator and the plurality of analog PID control loops are external control loops and the plurality of binary PID control loops are internal control loops,
wherein the internal control loops are configured to receive one or more inputs from the external control loops,
wherein the internal control loops are configured adjust the operation of the one or more coolant valves.

8. The method of claim 7, wherein the external control loops are configured to determine the target inlet coolant temperature configured to be received as the one or more inputs by the internal control loops.

9. A control device for regulating an outlet coolant temperature of a genset and an inlet coolant temperature of the genset, the control device comprising:
a non-transitory machine-readable storage medium having instructions stored thereon; and
a processing circuit configured to execute the instructions to:
determine a load condition of the genset;
select an operating mode from between a first mode associated with a first load condition and a second mode associated with a second load condition responsive to determining the load condition of the genset, wherein the first mode and the second mode are configured to determine a target inlet coolant temperature using one or more control loops;
determine, using the selected operating mode, the target inlet coolant temperature using a difference between the target outlet coolant temperature and the outlet coolant temperature; and
regulate the outlet coolant temperature based on the determined target inlet coolant temperature and the inlet coolant temperature by adjusting an operation of one or more coolant valves.

10. The control device of claim 9, wherein the processing circuit is configured to:
select the first mode responsive to determining the load condition of the genset is the first load condition,
wherein the first load condition is a steady state condition in which a load of the generator is below a predetermined load threshold value.

11. The control device of claim 9, wherein the processing circuit is configured to:
select the second mode responsive to determining the load condition of the genset is the second load condition,
wherein the second load condition is a steady state condition in which a load of the generator is above a predetermined load threshold value.

12. The control device of claim 9, wherein the processing circuit is configured to:
determine the load condition of the genset is a transient condition in which a load of the generator undergoes a transitory change,
wherein the transitory change comprises a change of at least 4% of a nominal load value.

13. The control device of claim 12, wherein the processing circuit is configured to:
determine the load condition of the genset is a start-up condition in which the generator is turned on for a first time and/or an operating temperature of the generator is below a predetermined temperature threshold value,
wherein determining the load condition of the genset is the start-up condition is based on information provided by a cold start indicator.

14. The control device of claim 13, wherein the processing circuit is configured to:
adjust the target inlet coolant temperature for a period of time using an interpolation calculator responsive to determining the load condition of the genset corresponds to the transient condition,
wherein the interpolation calculator is configured to adjust the target inlet coolant temperature using at least one of: the cold start indicator or the load of the generator,
wherein the cold start indicator comprises an indication of whether the outlet coolant temperature reaches the predetermined temperature threshold value.

15. The control device of claim 14, wherein the processing circuit is configured to:
determine the target inlet coolant temperature using at least one of a plurality of analog proportional-integral-derivative (PID) control loops, a plurality of binary PID control loops, and the interpolation calculator, wherein the interpolation calculator and the plurality of analog PID control loops are external control loops and the plurality of binary PID control loops are internal control loops, wherein the internal control loops are configured to receive one or more inputs from the external control loops, wherein the internal control loops are configured adjust the operation of the one or more coolant valves.

16. The control device of claim 15, wherein the external control loops are configured to determine the target inlet coolant temperature configured to be received as the one or more inputs by the internal control loops.

17. A genset comprising:
an engine;
a generator coupleable to a load; and
a cooling system configured to adjust a temperature of the engine, the cooling system comprising:
a heat exchanger;
a radiator;
one or more coolant valves;
one or more temperature sensors; and
at least one controller configured to regulate an outlet coolant temperature of the genset and an inlet coolant temperature of the genset, the controller comprising:
a non-transitory machine-readable storage medium having instructions stored thereon; and
a processing circuit configured to execute the instructions to:
determine a load condition of the genset;
select an operating mode from between a first mode associated with a first load condition and a second mode associated with a second load condition responsive to determining the load condition of the genset, wherein the first mode and the second mode are configured to determine a target inlet coolant temperature using one or more control loops;
determine, using the selected operating mode, the target inlet coolant temperature using a difference between the target outlet coolant temperature and the outlet coolant temperature; and
regulate the outlet coolant temperature based on the determined target inlet coolant temperature and the inlet coolant temperature by adjusting an operation of the one or more coolant valves.

18. The genset of claim 17, wherein the processing circuit is configured to:
select the first mode responsive to determining the load condition of the genset is the first load condition,
wherein the first load condition is a steady state condition in which a load of the generator is below a predetermined load threshold value.

19. The genset of claim 17, wherein the processing circuit is configured to:
select the second mode responsive to determining the load condition of the genset is the second load condition,
wherein the second load condition is a steady state condition in which a load of the generator is above a predetermined load threshold value.

20. The genset of claim 17, wherein the processing circuit is configured to:
determine the load condition of the genset is a transient condition in which a load of the generator undergoes a transitory change,
wherein the transitory change comprises a change of at least 4% of a nominal load value.

* * * * *